(12) United States Patent
Higuchi et al.

(10) Patent No.: US 7,619,037 B2
(45) Date of Patent: Nov. 17, 2009

(54) TRANSPARENT RESIN COMPOSITION

(75) Inventors: Shoichi Higuchi, Kyoto (JP); Satoshi Ogawa, Kyoto (JP); Hironobu Tokunaga, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 593 days.

(21) Appl. No.: 10/560,782

(22) PCT Filed: Jun. 18, 2004

(86) PCT No.: PCT/JP2004/008633

§ 371 (c)(1),
(2), (4) Date: Jun. 9, 2006

(87) PCT Pub. No.: WO2005/000967

PCT Pub. Date: Jan. 6, 2005

(65) Prior Publication Data

US 2006/0281860 A1 Dec. 14, 2006

(30) Foreign Application Priority Data

Jun. 18, 2003 (JP) ............................. 2003-173277
Oct. 31, 2003 (JP) ............................. 2003-373732

(51) Int. Cl.
*C08L 53/00* (2006.01)
*C09K 3/16* (2006.01)

(52) U.S. Cl. ..................... 525/88; 525/92 R; 525/92 C; 525/92 E; 525/92 F; 525/92 L

(58) Field of Classification Search .................. 525/88, 525/92 R, 92 C, 92 E, 92 F, 92 L
See application file for complete search history.

(56) References Cited

U.S. PATENT DOCUMENTS

| 4,469,845 | A | * | 9/1984 | Doak | .......................... 525/71 |
| 5,338,795 | A |  | 8/1994 | Fukumoto et al. |  |
| 6,020,426 | A | * | 2/2000 | Yamaguchi et al. | ........... 525/66 |
| 6,143,826 | A | * | 11/2000 | Ohnaga et al. | ................ 525/93 |
| 6,212,346 | B1 | * | 4/2001 | Hirabayashi et al. | ........ 399/176 |
| 6,395,829 | B1 | * | 5/2002 | Miyamoto et al. | ........... 525/71 |
| 2003/0183810 | A1 |  | 10/2003 | Fujihana et al. |  |

FOREIGN PATENT DOCUMENTS

| EP | 0 759 459 A | 2/1997 |
| JP | 62-273252 | 11/1987 |
| JP | 62273252 | 11/1987 |
| JP | 2-194052 | 7/1990 |
| JP | 2194052 | 7/1990 |
| JP | 5-320497 | 12/1993 |
| JP | 5320497 | 12/1993 |
| JP | 7010989 | 1/1995 |
| JP | 7-292234 | 11/1995 |
| JP | 7292234 | 11/1995 |
| JP | 08 059948 A | 3/1996 |
| JP | 9025335 | 1/1997 |
| JP | 10338740 | 12/1998 |
| JP | 11343401 | 12/1999 |
| JP | 2002-309097 | 10/2002 |
| JP | 2002309097 | 10/2002 |

OTHER PUBLICATIONS

Supplementary European Search Report on EP 04746135.5 dated Dec. 27, 2007.

* cited by examiner

*Primary Examiner*—Jeffrey C Mullis
(74) *Attorney, Agent, or Firm*—Westerman, Hattori, Daniels & Adrian, LLP

(57) ABSTRACT

The present invention has its object to provide a thermoplastic resin for producing moldings having enough transparency and excellent in permanent antistatic properties and mechanical properties. The present invention provides a transparent resin composition which comprises at least one block polymer (A) selected from the group consisting of specific block polymers (A1) and (A2) and a transparent resin (B), with the difference in refractive index between (A) and (B) being not more than 0.01.

15 Claims, No Drawings

TRANSPARENT RESIN COMPOSITION

TECHNICAL FIELD

The present invention relates to a thermoplastic resin composition for moldings excellent in permanent antistatic properties. More particularly, the present invention relates to a thermoplastic resin composition for moldings having transparency and excellent in permanent antistatic properties and mechanical properties.

BACKGROUND ART

A method so far widely known for providing a thermoplastic resin such as a polycarbonate resin or a polystyrene resin with antistatic properties without impairing the transparency thereof comprises applying or incorporating a surfactant to the resin surface or into the resin. However, it is difficult, by such method, to provide permanent antistatic properties, since the surfactant is readily removed upon washing with water or by friction.

Therefore, the following methods for providing permanent antistatic properties while maintaining the transparency have been proposed: (1) the method comprising adding to a polycarbonate resin a polyether ester, an ionic surfactant, a phenolic antioxidant and a spiro type phosphite compound (cf. e.g. Japanese Kokai Publication Hei-11-343401), (2) the method comprising adding to a polycarbonate resin a polyether ester derived from a sulfonic acid salt group-containing aromatic dicarboxylic acid and a halogen atom-containing diol (cf. e.g. Japanese Kokai Publication Hei-09-25335), (3) the method comprising adding to a polycarbonate resin a sulfonic acid salt group- and condensed polycyclic hydrocarbon skeleton-containing polyether ester and an ionic antistatic agent (cf. e.g. Japanese Kokai Publication Hei-10-338740), and (4) the method comprising adding to a polycarbonate resin a polyether ester amide derived from a polyamide oligomer and an ethylene oxide adduct of a bisphenol (cf. e.g. Japanese Kokai Publication Hei-07-10989), and the like.

SUMMARY OF THE INVENTION

However, the above-mentioned methods (1), (2) and (3) have problems, namely the antistatic agent is poorly compatible with the resin, causing decreases in the mechanical properties of the resin, although the transparency is maintained. The method (4) also has problems, namely the refractive index of the antistatic agent is low and, therefore, the transparency decreases upon admixture of the antistatic agent with the resin.

It is an object of the present invention to provide a thermoplastic resin composition for moldings excellent in transparency and also in permanent antistatic properties and mechanical properties.

As a result of intensive investigations made by them to accomplish the above object, the present inventors have now completed the present invention.

DETAILED DESCRIPTION OF THE INVENTION

Thus, the invention provides
a transparent resin composition
which comprises at least one block polymer (A) selected from the group consisting of the block polymers (A1) and (A2) defined below and a transparent resin (B), with the difference in refractive index between (A) and (B) being not more than 0.01:

(A1): Block polymers composed of an aromatic ring-containing lipophilic block (a) having a refractive index of not lower than 1.575 and a volume resistivity of $10^{12}$ to $10^{17}$ $\Omega \cdot cm$ and an aromatic ring-containing hydrophilic block (b) having a volume resistivity of $10^5$ to $10^{11}$ $\Omega \cdot cm$ and a thermal degradation temperature of 250 to 380° C. in air, with the difference in SP value from (B) being not greater than 1;

(A2): Block polymers composed of an aromatic ring-containing lipophilic block (a) having a refractive index of not lower than 1.575 and a volume resistivity of $10^{12}$ to $10^{17}$ $\Omega \cdot cm$, an aromatic ring-containing hydrophilic block (b) having a volume resistivity of $10^5$ to $10^{11}$ $\Omega \cdot cm$ and a thermal degradation temperature of 250 to 380° C. in air and a transparent resin block (c) having a refractive index of not lower than 1.540 and a difference in SP value from (B) of 0 to 0.5, with the difference in SP value from (B) being not greater than 1.5;

(B): A transparent resin having a refractive index of not lower than 1.540;

as well as a molded article produced by molding the above composition and having a haze of not higher than 20%; and a molded product obtainable by coating of and/or printing on that molded article.

[1] Block Polymers (A1)

In accordance with the invention, the block polymers (A1) are block polymers composed of an aromatic ring-containing lipophilic block (a) having a refractive index of not lower than 1.575 and a volume resistivity of $10^{12}$ to $10^{17}$ $\Omega \cdot cm$ and an aromatic ring-containing hydrophilic block (b) having a volume resistivity of $10^5$ to $10^{11}$ $\Omega \cdot cm$ and a thermal degradation temperature of 250 to 380° C. in air, with the difference in SP value from (B) being not greater than 1.

In the following, the blocks (a) and (b) are described.

[Aromatic Ring-Containing Lipophilic Block (a)]

The aromatic ring constituent of (a) includes benzene nucleus-containing aromatic rings containing 6 to 30 carbon atoms (hereinafter referred to as "C" for short), for example benzene, naphthalene, fluorene and anthracene rings, and C4-30 heterocycles, for example pyrrole, pyridine, imidazole, imidazolidine, imidazoline, pyrrolidine, piperidine, piperazine, morpholine and imide rings.

Among them, at least one species selected from the group consisting of benzene, naphthalene and fluorene rings is preferred from the low discoloration viewpoint.

The block (a) includes (a1) the one comprising an aromatic ring alone, (a2) the one whose main chain is constituted of aromatic rings and (a3) the one having aromatic rings in side chains.

The block (a1) includes the above-mentioned aromatic ring-containing compounds, for example C6-30 benzene nucleus-containing compounds such as benzene, naphthalene, fluorene and anthracene, and C4-30 heterocyclic compound such as pyrrole, pyridine, imidazole, imidazolidine, imidazoline, pyrrolidine, piperidine, piperazine, morpholine and glutarimide.

The block (a2) includes polymers in which every two neighboring aromatic rings are separated by a nonionic molecular chain (d).

The chain (d) comprises at least one divalent organic group selected from the group consisting of divalent hydrocarbon groups; divalent organic groups containing at least one bond selected from the group consisting of an ether bond, thioether bond, carbonyl bond, ester bond, imino bond, amide bond, imide bond, urethane bond, urea bond, carbonate bond and siloxy bond; and divalent organic groups having a nitrogen atom- or oxygen atom-contain in a heterocyclic structure.

As the divalent hydrocarbon groups, there may be mentioned, for example C1-18 (preferably C2-8) straight or branched aliphatic hydrocarbon groups [e.g. alkylene groups (e.g. ethylene, butylenes and hexamethylene) and alkenylene groups (e.g. ethynylene, butenylene and hexenylene)] and C6-20 aromatic hydrocarbon groups (e.g. phenylene, naphthylene, anthracene and fluorene).

As the divalent organic groups containing at least one linkage selected from the group consisting of an ether linkage, thioether linkage, carbonyl linkage, ester linkage, imino linkage, amide linkage, imide linkage, urethane linkage, urea linkage, carbonate linkage and siloxy linkage, there may be mentioned (poly)oxyalkylene groups; residues remaining after removal of an SH group from mono- and poly-thioethers, corresponding to those mentioned above (resulting from substitution of a sulfur atom(s) for the oxygen atom(s)); residues remaining after removal of a hydroxyl group(s), a carboxyl group(s) and/or an amino group(s) from polyester oligomers and/or polyamide oligomers [polyester oligomers (aromatic ring-containing (poly) ester oligomers (C10-30, e.g. polyester oligomers from ethylene glycol and terephthalic acid), aliphatic (poly)ester oligomers (C4-20), etc.] and/or polyamide oligomers [lactam ring opening polymers (polymers derived from a C6-12 lactam and/or a C4-20 dicarboxylic acid, for example polyamide oligomers derived from caprolactam and terephthalic acid), aminocarboxylic acid-derived polycondensates (polycondensates from a C6-12 aminocarboxylic acid and a C4-20 dicarboxylic acid), dicarboxylic acid-diamine polycondensates (polycondensates from a C4-20 dicarboxylic acid and a C6-12 diamine), etc.; residues resulting from removal of a hydroxyl group(s), an amino group(s) and/or an isocyanato group(s) from polyurethanes and/or polyureas; residues resulting from removal of hydroxyl groups from polycarbonates [derived from a dihydric phenol (b01) to be mentioned later herein and phosgene]; and residues resulting from removal of hydroxyl groups from polyorganosiloxanes, and the like.

Preferred among these (d) species from the viewpoint of the dispersibility in the transparent resin (B) are divalent hydrocarbon groups, and divalent organic groups containing at least one linkage selected from the group consisting of ether, ester, amide and carbonate linkages. More preferred are C2-8 alkylene groups, (poly)oxyalkylene (C2-4) groups, residues resulting from removal of a hydroxyl group(s), a carboxyl group(s) and/or an amino group(s) from polyester oligomers and/or polyamide oligomers. Particularly preferred are (poly)oxyethylene and (poly)oxypropylene groups, and ethylene glycol-terephthalic acid polyester oligomer and/or caprolactam-terephthalic acid polyamide oligomer residues.

From the antistatic properties viewpoint, the molecular weight of (d) is preferably 28 to 10,000 [expressed in terms of number average molecular weight (hereinafter referred to as "Mn" for short; determined by gel permeation chromatography (GPC))], more preferably 100 to Mn 5,000.

The Mn measurement conditions are as follows (hereinafter, all Mn measurements are made under the same conditions):

Apparatus: High temperature gel permeation chromatograph
Solvent: Orthodichlorobenzene
Standard substances: Polystyrene species
Sample concentration: 3 mg/ml
Column stationary phase: PLgel MIXED-B
Column temperature: 135° C.

As (a2), there may be mentioned condensation products (molecular weight: 250 to Mn 20,000) derived from a bifunctional aromatic ring-containing compound [e.g. a dicarboxylic acid (C8-30, e.g. phthalicacid, isophthalicacid, terephthalicacid, 2,6-naphthalenedicarboxylic acid), a dihydric phenol (C6-30, e.g. hydroquinone, catechol, resorcinol, bisphenol F, bisphenol A), a diol (C8-30, e.g. xylylene glycol) or a diamine (C6-30, e.g. phenylenediamine or xylylenediamine)] and another bifunctional compound reactive with the bifunctional aromatic ring-containing compound [e.g. an aromatic ring-free one (a diol (C2-30, e.g. ethylene glycol, 1,6-hexanediol), a diamine (C2-30, e.g. ethylenediamine, hexamethylenediamine) or a dicarboxylic acid (C2-30, e.g. oxalic acid, succinic acid, glutaric acid)) or an aromatic ring-containing one (e.g. any of the specific bifunctional aromatic ring-containing compounds enumerated above)]; and other polycondensates [molecular weight: 288 to Mn 20,000, e.g. poly(p-xylylene), polybenzothiazole, poly(p-phenylenepyromellitimide), poly(ethylene naphthalate), poly(p-phenylene ether), polyarylates, poly(m-phenyleneisophthalamide), poly(p-phenyleneterephthalamide), polycarbonates, polybenzimidazole, polybibenzothiazole and polybenzoxazole].

The block (a2) can be produced, for example, by the method comprising adding a bifunctional compound constituting (d) to a bifunctional aromatic ring-containing compound and subjecting the mixture to the polycondensation reaction under reduced pressure generally at 200 to 250° C.

In carrying out the above polymerization reaction, a catalyst can be used. As the catalyst, there may be mentioned, for example, antimony catalysts (e.g. antimony trioxide), tin catalysts (e.g. monobutyltin oxide, dibutyltin oxide), titanium catalysts (e.g. tetrabutyl titanate, tetrabutoxytitanate), zirconium catalysts (e.g. tetrabutyl zirconate), aluminum catalysts (e.g. tetraisopropoxyaluminate), organic acid metal salts [e.g. zirconium salts of organic acids (e.g. zirconyl acetate) and zinc acetate] and mixtures of two or more of these. Among them, tin catalysts, titanium catalysts, aluminum catalysts and organic acid metal salts are preferred, dibutyltin oxide, tetrabutoxytitanate, tetraisopropoxyaluminate, zirconyl acetate and zinc acetate are more preferred, and zirconyl acetate is most preferred.

The catalyst is used generally in an amount of 0.001 to 5% based on the total weight of the bifunctional aromatic ring-containing compound and the bifunctional compound constituting (d).

The block (a3) includes aromatic ring-containing lipophilic blocks having aromatic rings on side chains as obtainable by (co) polymerization of a vinyl monomer(s) (the term "vinyl monomer" means a monomer containing an ethylenically unsaturated group; hereinafter the same shall apply) containing a C4-30 aromatic ring [for example a benzene ring (e.g. benzene, naphthalene, anthracene or fluorene ring) and/or a heterocycle (e.g. pyrrole, pyridine, imidazole, imidazoline, piperidine, piperazine, furan, thiophen, γ-pyran, γ-thiopyran, thiazole, 1,3,5-triazine, indole, quinoline or purine ring)] or copolymerization thereof with another vinyl monomer(s) by various polymerization methods (e.g. radical polymerization method, Ziegler catalyst polymerization method, metallocene catalyst polymerization method).

As the benzene ring-containing vinyl monomer, there may be mentioned C8-32 ones, for example styrene and derivatives thereof [e.g. o-, m- and p-alkyl(C1-10)styrene (e.g. vinyltoluene), α-alkyl(C1-10)styrene (e.g. α-methylstyrene) and halogenated styrene (e.g. chlorostyrene)], C12-30 vinylnaphthalene and derivatives thereof, C13-40 vinylfluorene and derivatives thereof, and C16-40 vinylanthracene and derivatives thereof.

As the heterocycle-containing vinyl monomer, there may be mentioned C7-28 ones, for example vinylpyridines (e.g. 2-, 3- and 4-vinylpyridine); lower alkyl(C1-8)-substituted vinylpyridines (e.g. 2-methyl-, 2-ethyl, 3-methyl-, 2,3-dimethyl- and 2-methyl-3-ethyl-5-vinylpyridine), 1-vinylimidazole, N-vinylimidazole and vinylpiperidine.

As the other vinyl monomer copolymerizable with the aromatic ring-containing vinyl monomers, there may be mentioned, for example, hydrocarbons (e.g. aliphatic hydrocarbons and alicyclic hydrocarbons), acrylic monomers, unsaturated mono- and dicarboxylic acids and derivatives thereof, unsaturated alcohol carboxylate esters, unsaturated alcohol alkyl ethers, halogen-containing vinyl monomers, and mixtures of two or more of these (the mode of addition may be of random and/or block addition).

As the aliphatic hydrocarbons, there may be mentioned olefins [C2-30, e.g. ethylene, propylene, C4-30 (preferably C4-12, more preferably C4-10) α-olefins (e.g. 1-butene, 4-methyl-1-pentene, 1-pentene, 1-octene, 1-decene and 1-dodecene)] and alkadienes [C4-30 (preferably C4-18, more preferably C4-8), e.g. butadiene, isoprene and 1,11-dodecadiene].

As the alicyclic hydrocarbons, there may be mentioned cycloalkenes (C5-30, e.g. cyclopentene, cyclohexene, cycloheptene and cyclooctene) and cycloalkadienes (C5-30, e.g. cyclopentadiene, 1,3- and 1,4-cyclohexadiene, 1,3- and 1,4-cycloheptadiene, 1,3-, 1,4- and 1,5-cyclooctadiene and 1-methyl-1,4-cyclohexadiene).

As the acrylic monomers, there may be mentioned C3-30 ones, for example (meth)acrylic acid and derivatives thereof, (meth)acrylonitrile and (meth)acrylamide.

As the (meth)acrylic acid derivatives, there may be mentioned, for example, alkyl(C1-20) (meth)acrylates [e.g. methyl, ethyl and butyl (meth)acrylate] and mono- and dialkyl(C1-4)aminoalkyl(C2-4) (meth)acrylates [e.g. aminoethyl (meth)acrylate and dimethylaminoethyl (meth)acrylate].

As the unsaturated monocarboxylic acids, there may be mentioned C4-30 (preferably C4-18, more preferably C4-12) ones, for example crotonic acid, 3,3-dimethylacrylic acid, ethylacrylic acid, 2- and 4-pentenoic acid, 2- and 3-hexenoic acid, 2-methylpentenoic acid, 2,2-dimethylpentenoic acid, 6-heptenoic acid, 2-ethyl-2-hexenoic acid and 2-octenoic acid. As the unsaturated dicarboxylic acids, there may be mentioned C4-30 (preferably C4-18, more preferably C4-12) unsaturated dicarboxylic acids, for example maleic acid, fumaric acid and itaconic acid.

As the unsaturated mono- and dicarboxylic acid derivatives, there may be mentioned C4-30 ones, for example mono- and dialkyl(C1-20) esters (e.g. methyl crotonate, dimethyl maleate and diethyl itaconate), acid anhydrides (e.g. maleic anhydride, itaconic anhydride) and acid imides (e.g. maleimide).

As the unsaturated alcohol carboxylate esters, there may be mentioned C4-6 ones, for example unsaturated alcohol [C2-4, e.g. vinyl alcohol and (meth)allyl alcohol] carboxylic acid (C2-4) esters [e.g. vinyl acetate and (meth)allyl acetate]. As the unsaturated alcohol alkyl ethers, there may be mentioned C3-30 ones, for example unsaturated alcohol (same as above) alkyl(C1-20) ethers.

As the halogen-containing vinyl monomers, there may be mentioned C2-12 ones, for example vinyl chloride, vinylidene chloride and chloroprene.

The block (a3) can be produced by various polymerization methods, for example by bulk polymerization, pearl polymerization, solution polymerization and emulsion polymerization. The polymerization temperature is generally 25 to 250° C., and the polymerization time is generally 25 minutes to 10 hours.

As the polymerization initiator which can be used in the above polymerization, there may be mentioned, for example, azo type radical initiators, peroxide type radical initiators, and mixtures of these. Among them, functional group-containing initiators are preferred, and carbonyl, hydroxyl, amino, epoxy or isocyanato group-containing azo type radical initiators and carbonyl group-containing peroxide type radical initiators are more preferred.

Among the functional group-containing azo type radical initiators, the carbonyl group-containing ones are, for example, 3,3'-azobis(3-cyanopropionic acid), 4,4'-azobis(4-cyanovaleric acid), 4-tert-butylazo-4-cyanovaleric acid, 4,4'-azobis(4-cyanopetanoic acid), 2,2'-azobis(methyl isobutyrate), 1,1'-azobis(1-acetoxy-1-phenylethane), 1,1'-azobisformamide and 2-cyano-2-propylazoformamide; the hydroxyl group-containing ones are, for example, 2,2'-azobis[2-(hydroxymethyl)propionitrile], 2,2'-azobis[2-(hydroxyethyl)propionitrile], 2,2'-azobis[2-(hydroxymethyl)butyronitrile], 4,4'-azobiscyanopentanol, di-(3-hydroxybutyl)-2,2'-azobisisobutyrate and di-(4-hydroxybutyl)-2,2'-azobisisobutyrate.

As the amino group-containing ones, there may be mentioned, for example, 2,2'-azobis[2-(aminomethyl)propionitrile], 2,2'-azobis[2-(aminoethyl)propionitrile], 2,2'-azobis[2-(aminomethyl)butyronitrile] and 4-acetaminophenyl-azotriphenylmethane; as the epoxy group-containing ones, there may be mentioned, for example, 2,2'-azobis[2-(glycidyloxyethyl)propionitrile] and 2,2'-azobis[2-(glycidyloxyethyl)butyronitrile]; and, as the isocyanato group-containing ones, there may be mentioned, for example, 2,2'-azobis[2-(isocyanatoethyl)propionitrile] and 2,2'-azobis[2-(isocyanatoethyl)butyronitrile].

Among the functional group-containing peroxide type radical initiators, the carbonyl group-containing ones are, for example, cyclohexanone peroxide, succinic acid peroxide, tert-butyl peroxymaleate, methylcyclohexanone peroxide, tert-butyl peroxyacetate, cyclopentaneacetyl peroxide and cyclohexaneformyl peroxide; and cyclohexanone peroxide may be mentioned as the hydroxyl group-containing one.

As the amino group-containing ones, there may be mentioned, for example, dimethylaminomethyl tert-amyl peroxide, diethylaminomethyl tert-amyl peroxide, diisopropylaminomethyl tert-amyl peroxide, 1-[4-(dimethylamino)phenyl] ethyl tert-butyl peroxide and 2-[4-(dimethylamino)phenyl] propyl tert-butyl peroxide.

As other polymerization initiators than the above-mentioned functional group-containing initiators, there maybe mentioned initiators for styrene (co)polymerization, for example 2,2'-azobisisobutyronitrile, 1,1'-azobiscyclohexane-1-carbonitrile, 2,2'-azobis-4-methoxy-2,4-dimethylvaleronitrile, 2,2'-azobis-2,4-dimethylvaleronitrile, dimethyl 2,2'-azobis(2-methylpropionate), 1,1'-azobis(1-acetoxy-1-phenylethane), 2,2'-azobis(4-methoxy-2,4-dimethylvaleronitrile), benzoyl peroxide, di-tert-butyl peroxide, cumene hydroperoxide, triethylboron, diethyl hydrogen peroxide-$Fe^{2+}$ salt, persulfate-$NaHSO_3$, cumene hydroperoxide-$Fe^{2+}$ salt and lead salts. Preferred among these are 2,2'-azobisisobutyronitrile and 2,2'-azobis-2,4-dimethylvaleronitrile.

The terminal group of (a) includes the following groups: carbonyl-containing groups (including carboxyl, acetyl and formyl groups), hydroxyl group, isocyanato group, thiol group, epoxy group, amino group, silanol group, sulfo group, phosphoric acid group, vinyl group and vinylidene group. The terminal group is preferably a carbonyl-containing group, hydroxyl, isocyanato, thiol, epoxy and/or amino group, for example, from the viewpoint of reactivity with the hydrophilic block (b) and/or transparent resin block (c) to be described later herein.

From the viewpoint of reactivity with the block (b) to be described later herein, the lower limit to the molecular weight of (a) is preferably 93, more preferably 120, still more preferably 150, most preferably 200, and the preferred upper limit is preferably Mn 20,000, more preferably Mn 15,000, particularly preferably Mn 12,000, most preferably Mn 8,000.

The refractive index of (a) is not lower than 1.575, preferably 1.600 to 1.900. At levels lower than 1.575, the transparency and heat resistance will become deteriorated.

The refractive index is determined by calculation using a theoretical formula or by measuring the refractive indices of (A) and (B) in advance using an Abbe's refractometer according to JIS K 7142 (1996). The refractive index values reported herein are the values measured using an Abbe's refractometer.

The volume resistivity of (a) is $10^{12}$ to $10^{17}$ Ω·cm, preferably $10^{13}$ to $10^{16}$ Ω·cm, more preferably $10^{14}$ to $10^{15}$ Ω·cm. When the volume resistivity value is lower than $10^{12}$ Ω·cm, the dispersibility in the transparent resin to be described later herein becomes poor and, when it exceeds $10^{17}$ Ω·cm, the moldability of the resin composition to be described later herein becomes deteriorated. The volume resistivity of (a) can be adjusted so as to fall within the above range by taking such means as adjusting the aromatic ring content in (a).

The volume resistivity is determined in the following manner.

Each test specimen (100×100×2 mm) prepared by compression or injection molding at 130 to 280° C. is conditioned in an atmosphere of 23° C. and 50% RH for 48 hours. The test specimen is subjected to measurement in an atmosphere of 23° C. and 50% RH using a superinsulation resistance meter [according to ASTM D 257 (1984)]. As an apparatus for use in the measurement, there may be mentioned, for example, a Toa Denpa Kogyo model DSM-8103 apparatus (SME-8310 electrodes for flat sheet specimens).

[Hydrophilic Block (b)]

The block (b) includes nonionic hydrophilic blocks (b1), anionic hydrophilic blocks (b2) and cationic hydrophilic blocks (b3).

Included among the blocks (b1) are blocks obtainable by subjecting a dihydric phenol (b01) and an alkylene oxide (C2-12, including substituted alkylene oxides; hereinafter referred to as "AO" for short) to addition reaction and represented by the general formula:

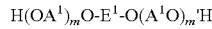

$$H(OA^1)_m O\text{-}E^1\text{-}O(A^1O)_{m'}H$$

wherein $A^1$ represents an alkylene group containing 2 to 12 (preferably 2 to 8, more preferably 2 to 4) carbon atoms (exclusive of the benzene ring carbon atoms), which may optionally be substituted by a halogen atom(s) and/or a benzene ring(s), $E^1$ represents the residue of a dihydric phenol after removal of hydroxyl groups and m and m' may be the same or different and each represents an integer of 1 to 500 (preferably 3 to 300, more preferably 8 to 250, most preferably 12 to 100).

As (b01), there may be mentioned C6-21 (preferably 8 to 16, more preferably 10 to 15) ones, for example monocyclic dihydric phenols (e.g. hydroquinone, catechol, resorcinol and urushiol), biphenyls (e.g. dihydroxybiphenyl), bisphenols (e.g. bisphenol A, —F, —S and 4,4'-dihydroxydiphenyl-2,2-butane) and condensed polycyclic dihydric phenols (e.g. dihydroxynaphthalene and binaphthol). Among these, bisphenols and condensed polycyclic dihydric phenols are preferred from the viewpoint of the heat resistance and transparency of the moldings, which are to be described later herein; bisphenol S is more preferred and bisphenol A and dihydroxynaphthalene are particularly preferred.

As the AO (C2-12) to be added to (b01), there may be mentioned, for example, ethylene oxide (hereinafter, "EO" for short), propylene oxide (hereinafter, "PO" for short), 1,2-, 2,3- and 1,4-butylene oxide, C5-12 α-olefin-derived epoxides, styrene oxide, epihalohydrins (e.g. epichlorohydrin and epibromohydrin), and mixtures of two or more of these. Among them, EO is preferred from the viewpoint of the antistatic properties of the moldings to be described later herein. The addition of the AO can be carried out, for example, in the presence of an alkali catalyst (preferably 0.0001 to 1% based on the weight of the product AO adduct) and generally at a temperature of 100 to 200° C.

From the viewpoint of the heat resistance and transparency of the moldings to be described later herein, bisphenol- and condensed polycyclic dihydric phenol-EO adducts are preferred among the blocks (b1), bisphenol S-EO adducts are more preferred, and bisphenol A- and dihydroxynaphthalene-EO adducts are particularly preferred. In the case of bisphenol A-EO adducts, their Mn is preferably 600 to 3,000, more preferably 1,000 to 2,500, most preferably 1,500 to 2,000.

Included among the anionic hydrophilic blocks (b2) are anionic hydrophilic blocks (b21) derived from a sulfo group-containing dicarboxylic acid and a diol as essential constituent units and preferably containing 2 to 80 (more preferably 3 to 60) sulfo groups within each molecule and anionic hydrophilic blocks (b22) obtainable by (co)polymerization of a sulfo group-containing vinyl monomer(s) or copolymerization thereof with another vinyl monomer (as described hereinabove) by various polymerization methods (e.g. radical polymerization, Ziegler catalyst polymerization, metallocene catalyst polymerization).

The sulfo group-containing dicarboxylic acid for constituting (b21), there may be mentioned sulfo group-containing aromatic and aliphatic dicarboxylic acids.

Included among the sulfo group-containing aromatic dicarboxylic acids are C8-20 ones, for example 2-, 4- or 5-sulfoisophthalic acid, 4-sulfo-2,6-naphthalenedicarboxylic acid, and salts of these with respect to the sulfo group alone and ester form derivatives thereof [e.g. lower (C1-4) alkyl esters (e.g. methyl ester and ethyl ester) and acid anhydrides].

Included among the sulfo group-containing aliphatic dicarboxylic acids are C4-18 ones, for example sulfosuccinic acid, salts thereof with respect to the sulfo group alone and ester form derivatives thereof (as mentioned above).

As the salts of the above-mentioned dicarboxylic acids with respect to the sulfo group alone, there may be mentioned alkali metal (e.g. lithium, sodium, potassium) or alkaline earth metal (e.g. calcium. magnesium) salts, ammonium salts, amine (C1-C30) salts, mono-, di- or trialkanolamine (C2-6) salts, quaternary ammonium salts corresponding to the amine salts mentioned above, and mixtures of two or more of these.

Preferred among these from the heat resistance viewpoint are sulfo group-containing aromatic dicarboxylic acids; more preferred are 2-, 4- or 5-sulfoisophthalic acid and 4-sulfo-2, 6-naphthalenedicarboxylic acid.

As the diol for constituting (b21), there may be mentioned, for example, alkylene glycols, polyoxyalkylenes, and AO adducts derived from hydroxyl group-containing compounds.

As the alkylene glycols, there may be mentioned C2-C12 ones, for example ethylene glycol, propylene glycol, 1,6-hexanediol and 1,12-dodecanediol.

As the polyoxyalkylenes (the alkylene being a C2-4 one; the mode of addition including the random and/or block copolymer type), there may be mentioned those with a degree of polymerization of 2 to 60, for example polyoxyethylene (e.g. polymerization degree: 2 to 20), polyoxypropylene (e.g. polymerization degree: 2 to 20) and polyoxyethylene/propylene copolymers (weight ratio 10/90 to 90/10) (e.g. polymerization degree: 2 to 30).

The hydroxyl group-containing compound for constituting AO adducts thereof includes, for example, alkylene glycols (as mentioned above) and dihydric phenols (as mentioned hereinabove). The hydroxyl group-containing compound-AO adducts generally have a molecular weight of Mn 150 to 2,500, preferably (from the heat resistance viewpoint) Mn 300 to 2,000.

Among those diols, C2-10 alkylene glycols, polyoxyethylene species with a degree of polymerization of 2 to 20, bisphenol-EO (2 to 60 moles) adducts, and mixtures of two or more of these are preferred from the heat resistance and antistatic properties viewpoint, ethylene glycol and polyoxyethylene (polymerization degree: 6 to 15) are more preferred, and bisphenol A-EO (6 to 20 moles) adducts are most preferred.

The blocks (b21) can be produced in the same manner as the above-mentioned blocks (a2).

As another form of (b2), there may be mentioned anionic hydrophilic blocks (b22) obtainable by (co)polymerizing a sulfo group-containing vinyl monomer(s) by various polymerization methods (e.g. radical polymerization, Ziegler catalyst polymerization and metallocene catalyst polymerization).

As the sulfo group-containing vinyl monomers, there may be mentioned C4-25 unsaturated sulfones and sulfoxides, for example vinyl ethyl sulfone, divinyl sulfone and divinyl sulfoxide; as well as C2-25 unsaturated sulfonic acids (salts), for example alkenesulfonic acids [e.g. vinyl-, methylvinyl-, ethylvinyl-, n- or isopropylvinyl-, n-, iso-, sec- or tert-butylvinyl- or n-amylvinylsulfonic acid, and (meth)allylsulfonic acid], unsaturated aromatic sulfonic acids (e.g. styrenesulfonic acid and α-methylstyrenesulfonic acid), sulfocarboxylic acid (e.g. α-sulfoalkanoic acid, sulfosuccinic acid) alkenyl or alkyl (C1-18) alkenyl esters [e.g. methyl vinyl, propyl (meth)allyl or stearyl (meth)allyl sulfosuccinate, (meth)allyl sulfolaurate], sulfo(hydroxy)alkyl (meth)acrylate and the corresponding (meth)acrylamides [e.g. sulfoethyl or sulfopropyl (meth)acrylate, 3-(meth)acryloyloxy-2-hydroxypropanesulfonic acid, 2-(meth)acrylamido-2-methylpropanesulfonic acid, 3-(meth)acrylamido-2-hydroxypropanesulfonic acid] and salts of these.

As the sulfo group salts, there may be mentioned alkali metal (as mentioned above) salts, alkaline earth metal (as mentioned above) salts, ammonium salts, amine [e.g. hydroxyalkyl (C2-4) group-containing mono-, di- or tri-amine] salts, quaternary ammonium salts resulting from quaternization of such amines (salts) with a quaternizing agent (e.g. methyl chloride, dimethyl sulfate, benzyl chloride), and mixture of two or more of these.

From the viewpoint of the dispersibility in the transparent resin (B) to be described later herein, alkenesulfonic acids, unsaturated aromatic sulfonic acids and salts thereof are preferred, ethylvinyl-, n-propylvinyl- and styrenesulfonic acid and salts of these are more preferred, and styrenesulfonic acid and salts thereof are particularly preferred, among these.

As the vinyl monomer copolymerizable with the sulfo group-containing vinyl monomers, there may be mentioned those aromatic ring-containing monomers mentioned above, hydrocarbon vinyl monomers (e.g. aliphatic hydrocarbons, alicyclic hydrocarbons), acrylic monomers, other unsaturated mono- or dicarboxylic acids and derivatives thereof, unsaturated alcohol carboxylate esters, unsaturated alcohol alkyl ethers, halogen-containing vinyl monomers, and mixtures of two or more of these (the mode of addition being random and/or blockwise).

The blocks (b22) can be produced by various polymerization methods, namely by the same methods as mentioned above for the blocks (a3).

Usable as the cationic hydrophilic blocks (b3) are cationic polymers containing, within the molecule thereof, 2 to 80 (preferably 3 to 60) cationic groups every two of which are separated from each other by such a nonionic molecular chain (d) as mentioned above.

Preferred as such (d) from the viewpoint of the mechanical properties of the moldings to be described later herein are divalent hydrocarbon groups and ether bond-containing divalent organic groups. More preferred are C2-8 alkylene groups and a phenylene group. Particularly preferred are (poly)oxyalkylene groups. Most preferred are (poly)oxyethylene and (poly)oxypropylene groups.

The cationic groups include groups containing a quaternary ammonium salt or phosphonium salt moiety. Quaternary ammonium salt moiety-containing divalent heterocyclic groups are preferred as the quaternary ammonium salt moiety-containing group.

As the quaternary ammonium salt moiety-containing divalent heterocyclic groups, there may be mentioned groups having a structure resulting from quaternization of a tertiary amino group-containing divalent heterocyclic group [e.g. divalent imidazole ring group (e.g. 1,4-imidazolylene, 2-phenyl-1,4-imidazolylene), divalent piperidine ring group (e.g. 2,3-,3,4- or 2,6-piperidylene) or divalent aromatic heterocyclic group (e.g. 2,3-, 2,4-, 2,5-, 2,6-, 3,4- or 3,5-pyridylene, 2,5-pyrimidinylene, 3,6-pyridazinylene, 2,5-pyrazinylene)].

The counter anion to such a cationic group includes the anions of superacids having a Hammett acidity function (—$H_0$) value of not lower than 12 (e.g. protonic acids, protonic acid-Lewis acid combinations) and other anions.

As the superacid anions, there may be mentioned, for example, $CF_3SO_3^-$, $N(CF_3SO_3)_2^-$, $BF_4^-$, $PF_6^-$, $SbF_6^-$, $AsF_6^-$, $TlF_6^-$, $BF_3Cl^-$, $PF_5Cl^-$, $SbF_5Cl^-$, $AsF_5Cl^-$, $TlF_5Cl^-$, $BF_3Br^-$, $PF_5Br^-$, $SbF_5Br^-$, $AsF_5Br^-$, $TlF_5Br^-$, $BF_3I^-$, $PF_5I^-$, $SbF_5I^-$, $AsF_5I^-$ and $TlF_5^-$.

As the other anions, there may be mentioned, for example, halogen ions (e.g. $F^-$, $Cl^-$, $Br^-$, $I^-$), $OH^-$, $PO_4^-$, alkyl sulfate ions (e.g. $CH_3OSO_3^-$, $C_2H_5OSO_3^-$, $CF_3OSO_3^-$), $ClO_4^-$, and the anions of sulfo group-containing aromatic compounds [C12-30 ones, e.g. alkyl(C6-18)benzenesulfonic acids, naphthalenesulfonic acids].

Preferred among these from the viewpoint of the heat resistance and antistatic properties of the moldings to be described later herein are $CF_3SO_3^-$, $BF_4^-$, $N(CF_3SO_3)_2^-$, $SbF_6^-$, $AsF_6^-$, $TlF_6^-$, and the anions of alkyl(C6-18)benzenesulfonic acids and naphthalenesulfonic acids. More preferred are $CF_3SO_3^-$, $N(CF_3SO_3)_2^-$, $BF_4^-$ and the anions of alkyl(C6-18)benzenesulfonic acids and naphthalenesulfonic acids.

As a method of producing (b3), there may be mentioned, for example, the method comprising reacting an amino group (secondary or tertiary)-containing diol with a quaternizing agent (2 equivalents or 1 equivalent per equivalent of the amino group, respectively), in necessary in the presence of a solvent and then subjecting the resulting quaternized diol, or a mixture thereof with the diol before quaternization, and a dicarboxylic acid [or an ester-forming derivative thereof (e.g. acid anhydride, lower alkyl ester, acid halide)] to polyesterification or polyesterification/amidation reaction.

The terminal group of (b) includes carbonyl group-containing groups (inclusive of carboxyl, acetyl and formyl) as well as hydroxyl, isocyanato, thiol, epoxy, amino and silanol groups. Among these, the carbonyl group-containing groups, hydroxyl, isocyanato, thiol, epoxy or/and amino groups are preferred from the viewpoint of the reactivity with the aromatic ring-containing lipophilic block (a) and/or transparent resin block (c).

From the viewpoint of the antistatic properties of the moldings to be described later herein and of the reactivity with (a) and/or (c), the Mn of (b) is preferably 500 to 20,000, more preferably 1,000 to 15,000, particularly preferably 1,200 to 8,000.

Among such blocks (b), hydrophilic blocks comprising one or more species selected from the group consisting of the blocks (b1) and (b2) are preferred from the viewpoint of the heat resistance of the moldings to be described later herein.

The thermal degradation temperature of (b) in air is 250 to 380° C., preferably 270 to 350° C., more preferably 280 to 330° C. When the thermal degradation temperature is lower than 250° C., the heat resistance and mechanical properties of the moldings to be described later herein will decrease and, when it is above 380° C., the moldability of the resin composition will become poor. The thermal degradation temperature in air is determined in the following manner.

(1) A 10-g portion of each hydrophilic block (b) is placed in a dish with a diameter of 70 mm and a depth of 20 mm, and dried in a vacuum drier for 2 hours under the conditions of 80±5° C. and a reduced pressure of not higher than 1.3 kPa. The block sample is then allowed to stand in a 3-L desiccator containing 200 g of silica gel for 60 minutes and thus cool to 23° C., and then subjected to measurement.

(2) A 50-mg portion of the measurement sample is weighed in a sample vessel, the whole is placed on a thermobalance and, after an hour of passage of dry air at 23° C. at a flow rate of 100 ml/minute, the TG-DTA measurement is carried out in accordance with the method of thermogravimetry of plastics described in JIS K 7120 (1987).

The thermal degradation temperature is the value obtained in accordance with the method of analyzing TG curves as described in JIS K 7120 (1987), Section 8 (in case multistage mass losses are observed, the first thermal degradation temperature is taken as the thermal degradation temperature so referred to herein).

As an apparatus to be used in the above measurement, there may be mentioned, for example, Rikagaku Kikai model TG-8110 (sample holder unit: alumina/platinum thermocouple; protective tube: made of quartz; sample vessel: 5.2 mm in outside diameter, 2.5 mm in height, made of alumina or platinum-rhodium alloy).

The volume resistivity of (b) is $10^5$ to $10^{11}$ Ω·cm, preferably $5 \times 10^5$ to $1 \times 10^{10}$ Ω·cm, more preferably $10^6$ to $10^8$ Ω·cm. When the volume resistivity is lower than $10^5$ Ω·cm, the dispersibility in the transparent resin (B) to be described later herein and the water resistance of the product moldings will become poor and, when it is above $10^{11}$ Ω·cm, the antistatic properties of the moldings will become poor.

The block polymer (A1) in accordance with the present invention is composed of (a) and (b), and includes block polymers (A11) having a structure such that the blocks (a) and (b) are bound together one after the other, and block polymers (A12) having a structure such that (b) as the main chain has (a) in the form of side chains.

In (A1), (a) and (b) are linked together via at least one linkage selected from the group consisting of ether, thioether, carbonyl, ester, imino, amide, imide, urethane, urea, carbonate and siloxy linkages.

In (A12), (a) and (b) may be linked together via an ionic linkage.

From the viewpoint of the mechanical properties of the moldings to be described later herein, the mean number of repetitions (Nn) of the repeating units (a) and (b) constituting (A11) is preferably 2 to 50, more preferably 2.3 to 30, particularly preferably 2.7 to 20, most preferably 3 to 10.

The number Nn can be determined by the method described in WO 00/47652 from the Mn of (A11) and the data from $^1$H-NMR analysis.

The content of the block (a) constituting (A12) amounts to 2 to 80 blocks, preferably 3 to 60 blocks, particularly preferably 5 to 40, per molecule of (b).

From the viewpoint of the mechanical properties of the moldings to be described later herein, the Mn of (A1) is preferably 2,000 to 60,000, more preferably 5,000 to 40,000, particularly preferably 8,000 to 30,000.

From the heat resistance viewpoint, a preferred lower limit to the refractive index of (A1) is 1.550, more preferably 1.560 and, an upper limit thereto preferred from the water resistance and moldability viewpoint is 1.650, more preferably 1.600.

A lower limit to the SP value of (A1) as preferred from the heat resistance viewpoint is 9.5, more preferably 10.0, and an upper limit thereto preferred from the water resistance and moldability viewpoint is 16.0, more preferably 15.0.

The SP value is the value determined by calculation according to the method of Fedors (Polymer Engineering and Science, vol. 14, p. 152), for instance.

The difference in refractive index between the block polymer (A) and the transparent resin (B) to be described later herein is not greater than 0.01, and the difference in SP value between (A1) and (B) is not greater than 1. The blocks (a) and (b) constituting (A1) each may optionally comprise one single species or two or more species provided that the above-mentioned relations with respect to the refractive index and SP value are satisfied.

The block polymers (A1) can be produced, for example, by the method comprising adding (b1) to (a1) and carrying out the polymerization (polycondensation) reaction under reduced pressure generally at 200 to 250° C. or the method comprising carrying out the polymerization generally at 160 to 250° C. with a residence time of 0.1 to 20 minutes using a single-screw or twin-screw extruder.

In carrying out the above polymerization reaction, a catalyst, for example any of those used for the production of (a2), can be used. The amount of the catalyst to be used is generally 0.001 to 5% relative to the total weight of (a1) and (b1).

From the antistatic properties viewpoint, the amount of (b) constituting (A1) is preferably 20 to 90%, more preferably 25 to 80%, particularly preferably 30 to 70%, based on the total weight of (a) and (b).

[2] Block Polymers (A2)

In accordance with the present invention, each block polymer (A2) is a block polymer which is composed of the above-mentioned (a) and (b), together with the transparent resin block (c) having a refractive index of not lower than 1.540 and differing in SP value from (B) by 0 to 0.5, and differs in SP value from (B) by not greater than 1.5.

In the following, the block (c) is described.

[Transparent Resin Block (c)]

The transparent resin block (c) is a block having a refractive index of not lower than 1.540 (preferably 1.550 to 1.650) and differing in SP value from the transparent resin (B) to be described later herein by 0 to 0.5 (preferably 0 to 0.2). When the refractive index is lower than 1.540, the transparency of the moldings to be described later herein will decrease and, when the difference in SP value is greater than 0.5, the mechanical properties of the moldings will become deteriorated.

The transparent resin constituting (c) includes polycarbonate resins (c1), polyester resins (c2) and/or polystyrene resins (c3). Among these, the resins (c2) are preferred and the resins (c1) are more preferred from the ease of production viewpoint.

How to combine these with the transparent resin (B) to be described later herein is not particularly restricted but, when (B) is a polycarbonate resin (B1), polyester resin (B2) or polystyrene resin (B3), (c1), (c2) or (c3) is respectively preferred as (c) from the viewpoint of compatibility with (B).

As the polycarbonate resins (c1), there maybe mentioned, for example, polycarbonates derived from a bisphenol [C13-20, for example bisphenol A, bisphenol F, bisphenol S, 4,4'-dihydroxydiphenyl-2,2-butane, with bisphenol A being preferred from the viewpoint of the dispersibility of (A) in (B)] or a biphenyl (C12-20, for example 4,4'-dihydroxybiphenyl), for example condensates of the above-mentioned bisphenols or biphenyls with phosgene or a carbonic acid diester.

From the viewpoint of the mechanical properties and antistatic properties of the moldings, the MFR (melt flow rate) of (c1) is preferably 0.5 to 150, more preferably 1 to 100. The MFR is measured in accordance with JIS K 7210 (1994) (in the case of polycarbonate resins, at 280° C. under a load of 2.16 kgf) The terminal group of (c1) includes a hydroxyl group and ester groups.

As the polyester resins (c2), there may be mentioned aromatic ring-containing polyesters (e.g. polyethylene terephthalate, polybutylene terephthalate, polycyclohexanedimethylene terephthalate, polyethylene naphthalate) and aliphatic polyesters (e.g. polybutylene adipate, polyethylene adipate, poly-ε-caprolactone).

From the viewpoint of the mechanical properties and antistatic properties of the moldings, the resins (c2) preferably have an intrinsic viscosity [η] of 0.1 to 4, more preferably 0.2 to 3.5, particularly preferably 0.3 to 3. The [η] is measured with a 0.5% (by weight) orthochlorophenol solution of each polymer at 25° C. using an Ubbelohde 1A viscometer.

The terminal group of (c2) includes a carboxyl group and a hydroxyl group.

As the polystyrene resins (c3), there may be mentioned homopolymers of a vinyl group-containing aromatic hydrocarbon alone or copolymers derived from a vinyl group-containing aromatic hydrocarbon and at least one member selected from the group consisting of (meth)acrylate esters and (meth)acrylonitrile as constituent units.

As the vinyl group-containing aromatic hydrocarbon, there may be mentioned C8-30 ones, namely styrene and derivatives thereof [e.g. o-, m- or p-alkyl(C1-10) styrene (e.g. vinyltoluene) α-alkyl(C1-10)styrene (e.g. α-methylstyrene) and halogenated styrene (e.g. chlorostyrene).

Specific examples of (c3) are polystyrene, polyvinyltoluene, acrylonitrile/styrene copolymers (AS resins) [copolymerization ratio (by weight)=20/80 to 30/70] and methyl methacrylate/styrene copolymers (MS resins) [copolymerization ratio (by weight)=10/90 to 40/60].

From the viewpoint of the mechanical properties and antistatic properties of the moldings, the resins (c3) preferably have a MFR of 0.5 to 150, more preferably 1 to 100. The MFR is measured in accordance with JIS K 7210 (1994) (in the case of polystyrene resins, at 230° C. under a load of 1.2 kgf).

The terminal group of (c3) includes a carboxyl group, hydroxyl group and amino group. The method comprising subjecting a styrenic monomer to radical polymerization using a carboxyl, hydroxyl or amino group-containing radical polymerization initiator maybe mentioned as a method of forming such terminal group.

Hydroxyl and carboxyl groups are preferred as the terminal group of (c) from the viewpoint of the reactivity with (a) and/or (b).

The block polymer (A2) includes block polymers (A21) having a structure such that (a), (b) and (c) are linked together in a random manner and block polymers (A22) with a structure such that a main chain composed of (b) and (c) has side chains consisting of (a).

In (A2), (a), (b) and (c) are linked together via at least one linkage species selected from the group consisting of ether, thioether, carbonyl, ester, imino, amide, imide, urethane, urea, carbonate and siloxy linkages.

In (A22), (a) and (b) may be linked together via ionic linkage.

(A21) can be produced, for example, by the method comprising adding (b1) and (c1) to (a1) and carrying out the polymerization (polycondensation) reaction under reduced pressure generally at 200 to 250° C. or the method comprising carrying out the polymerization and/or transesterification generally at 160 to 250° C. with a residence time of 0.1 to 20 minutes using a single-screw or twin-screw extruder.

In carrying out the above polymerization reaction, a catalyst, for example any of those used for the production of (a2), can be used. The amount of the catalyst to be used is generally 0.001 to 5% relative to the total weight of (a1), (b1) and (c1).

(A22) can be produced, for example, by the method comprising adding (c1) to (b2), carrying out the polymerization (polycondensation) reaction generally at 200 to 250° C. under reduced pressure, then adding (a3) and carrying out the polymerization (polycondensation) reaction generally at 200 to 250° C. under reduced pressure.

As for the proportions of the blocks (a), (b) and (c) constituting (A2) relative to the total weight thereof, a lower limit to (a) as preferred from the viewpoint of the transparency of the moldings is 20%, more preferably 30%, particularly preferably 40%, and an upper limit thereto preferred from the antistatic properties of the moldings is 70%, more preferably 65%, particularly preferably 60%; a lower limit to (b) as preferred from the viewpoint of the antistatic properties of the moldings is 20%, more preferably 25%, particularly preferably 30%, and an upper limit thereto preferred from the mechanical properties and transparency of the moldings is 70%, more preferably 65%, particularly preferably 60%; a lower limit to (c) as preferred from the viewpoint of the mechanical properties and transparency of the moldings is 1%, more preferably 5%, particularly preferably 10%, and an upper limit thereto preferred from the antistatic properties of the moldings is 50%, more preferably 40%, particularly preferably 35%.

From the antistatic properties viewpoint, the weight ratio between (a) and (b) is preferably 80/20 to 10/90, more preferably 75/25 to 20/80, particularly preferably 70/30 to 30/70.

From the viewpoint of the mechanical properties of the moldings to be described later herein, the Mn of (A2) is preferably 2,000 to 60,000, more preferably 5,000 to 40,000, particularly preferably 8,000 to 30,000.

From the heat resistance viewpoint, a lower limit to the refractive index of (A2) is preferably 1.550, more preferably 1.560 and, from the water resistance and moldability viewpoint, a preferred upper limit thereto is 1.650, more preferably 1.600.

From the heat resistance viewpoint, a lower limit to the SP value of (A2) is preferably 9.5, more preferably 10.0 and, from the water resistance and moldability viewpoint, a preferred upper limit thereto is 16.0, more preferably 15.0.

[3] Transparent Resin (B)

In accordance with the present invention, the transparent resin (B) has a refractive index of not lower than 1.540 (a preferred lower limit being 1.550, more preferably 1.560, and a preferred upper limit being 1.650, more preferably 1.630, particularly preferably 1.600, most preferably 1.595). When the refractive index is lower than 1.540, the transparency of the moldings to be described later herein become deteriorated.

From the viewpoint of the mechanical properties of the moldings, the Mn of (B) is preferably 20,000 to 500,000, more preferably 25,000 to 450,000, particularly preferably 30,000 to 400,000.

From the viewpoint of the heat resistance of the moldings, a lower limit to the SP value of (B) is preferably 9.5, more preferably 10.0, particularly preferably 10.5 and, from the viewpoint of the water resistance of the moldings, a preferred upper limit thereto is 16.0, more preferably 15.5, particularly preferably 15.0.

The resin (B) includes the same polycarbonate resins (B1), polyester resins (B2) and polystyrene resins (B3) as mentioned above as examples of the resins constituting (c) [(c1), (c2) and (c3)]. Among these, the resins (B2) are preferred from the viewpoint of the differences in refractive index from (A1) and (A2), and the resins (B1) are more preferred.

[4] Transparent Resin Composition

The transparent resin composition of the invention comprises at least one block polymer (A) selected from the group consisting of the block polymers (A1) and (A2), together with the transparent resin (B), and satisfies the condition that the difference in refractive index between (A) and (B) should be not greater than 0.01.

When the "difference in refractive index" or "difference in SP value" is referred to herein, the term "difference" means the absolute value of each difference.

In the above composition, the difference in refractive index between (A) and (B) is not greater than 0.01 (preferably 0 to 0.008, more preferably 0 to 0.006). When the refractive index difference is greater than 0.01, the transparency of the moldings to be described later herein will decrease.

A lower limit to the refractive index of (A) as preferred from the heat resistance viewpoint is 1.550, more preferably 1.560, and an upper limit thereto preferred from the water resistance and moldability viewpoint is 1.650, more preferably 1.600.

The refractive index is determined by calculation using a theoretical formula, as mentioned above, or by measuring the refractive indices of (A) and (B) in advance using an Abbe's refractometer according to JIS K 7142 (1996). The refractive index values reported herein are the values measured using an Abbe's refractometer.

The difference in SP value between (A1) constituting (A) on one hand and (B) on the other is not greater than 1 (preferably 0 to 0.8, more preferably 0 to 0.5). When the difference in SP value is greater than 1, the mechanical properties of the moldings to be described later herein become deteriorated.

The difference in SP value between (A2) constituting (A) on one hand and (B) on the other is not greater than 1.5 (preferably 0 to 1.0, more preferably 0 to 0.8). When the difference in SP value is greater than 1.5, the mechanical properties of the moldings to be described later herein become deteriorated.

The difference in SP value between (A1) and (B) or between (A2) and (B) is the value determined by calculation, as mentioned above, using the method of Fedors (Polymer Engineering and Science, vol. 14, p. 152), for instance.

The relation between the refractive index of (A) and that of (B), and the relation between the SP value of (A1) and that of (B) or between the SP value of (A2) and that of (B) can be adjusted by selecting the species and amounts of (a) and (b) constituting (A1) or (a), (b) and (c) constituting (A2) and the species of (B).

(A) is used as an antistatic agent for the resin composition of the invention, and the weight ratio between (A) and (B) in the resin composition can be widely varied according to the performance characteristics required and, from the viewpoint of the antistatic properties and mechanical properties of the moldings, it is preferably 1/99 to 40/60, more preferably 1.5/98.5 to 30/70.

The resin composition of the invention may further contain at least one additive (C) selected from the group consisting of alkali metal or alkaline earth metal salts (C1), surfactants (C2), compatibilizers (C3) and ionic liquids (C4) so that antistatic properties may further be improved within the limits within which the effects of the invention will not be sacrificed.

The total content of such additives (C) is generally not higher than 40% based on the total weight of (A) and (B) and, from the viewpoint of the mechanical properties of the moldings, it is preferably 0.001 to 40%, more preferably 0.1 to 20%, particularly preferably 0.5 to 10%.

As the alkali metal salt or alkaline earth metal salts (C1), there may be mentioned alkali metal (e.g. lithium, sodium, potassium) or alkaline earth metal (e.g. magnesium, calcium) salts of organic acids (C1-7 mono- and dicarboxylic acids, e.g. formic acid, acetic acid, propionic acid, benzoic acid, oxalic acid and succinic acid; C1-9 sulfonic acids e.g. methane sulfonic acid, p-toluenesulfonic acid and trifluoromethanesulfonic acid) and of inorganic acids [e.g. hydrohalic acids (e.g. hydrochloric acid, hydrobromic acid), perchloric acid, sulfuric acid, phosphoric acid and thiocyanic acid].

As specific examples of (C1), there may be mentioned, for example, halides (e.g. lithium chloride, sodium chloride, potassium chloride, calcium chloride, magnesium chloride, calcium chloride, lithium bromide, sodium bromide, potassium bromide, calcium bromide and magnesium bromide), acetates (e.g. lithium acetate, potassium acetate), perchlorates (e.g. lithium perchlorate, sodium perchlorate, potassium perchlorate), sulfates (e.g. potassium sulfate), phosphates (e.g. potassium phosphate) and thiocyanates (e.g. potassium thiocyanate).

Preferred among these from the antistatic properties and transparency viewpoint are halides (more preferably lithium chloride, sodium chloride and potassium chloride), acetates (more preferably potassium acetate) and perchlorates (more preferably potassium perchlorate).

The amount of (C1) to be used based on the total weight of (A) and (B) is generally not higher than 5% and, from the viewpoint that it will not precipitate out on the resin surface but can give a good appearance and good antistatic properties to the moldings, it is preferably 0.001 to 3%, more preferably 0.01 to 2.5%, particularly preferably 0.1 to 2%, most preferably 0.15 to 1%.

As for the method of causing (C1) to be contained in the composition, the method preferably comprises dispersing the same in advance in (A), more preferably causing (C1) in (A) on the occasion of production thereof, so that the transparency of the moldings may not be impaired. The timing of causing (C1) to be contained in (A) on the occasion of production thereof is not particularly restricted but the addition may be made before, during or after polymerization. The addition before polymerization is preferred, however.

The surfactants (C2) include nonionic surfactants, anionic surfactants, cationic surfactants and amphoteric surfactants.

As the nonionic surfactants, there may be mentioned, for example, EO adduct type nonionic surfactants [e.g. higher (C8-18) alcohol-, higher (C12-24) fatty acid or higher (C8-24) alkylamine-EO adducts (molecular weight: 158 to Mn 200,000); glycol-EO adduct or polyalkylene glycol (molecular weight: 150 to Mn 6,000) higher fatty acid esters; polyhydric alcohol (C2-18 dihydric to octahydric or further polyhydric alcohol, e.g. ethylene glycol, propylene glycol, glycerol, pentaerythritol, sorbitan) higher fatty acid ester-EO adducts (molecular weight: 250 to Mn 30,000); higher fatty acid amide-EO adducts (molecular weight: 200 to Mn 30,000); and polyhydric alcohol (as mentioned above) alkyl (C3-60) ether-EO adducts (molecular weight 120 to Mn 30,000)], and polyhydric alcohol (C3-60) type nonionic surfactants [e.g. polyhydric alcohol fatty acid (C3-60) esters, polyhydric alcohol alkyl(C3-60) ethers and fatty acid (C3-60) alkanolamides].

As the anionic surfactants, there may be mentioned compounds other than the above-mentioned (C1), for example carboxylic acids (e.g. C8-22 saturated or unsaturated fatty acids and ether carboxylic acids) or salts thereof; sulfate ester salts [e.g. higher alcohol sulfate ester salts (e.g. C8-18 -aliphatic alcohol sulfate ester salts) and higher alkyl ether sulfate ester salts [e.g. C8-18 aliphatic alcohol-EO (1 to 10 moles) adduct sulfate ester salts]]; sulfonic acid salts [C10-20, e.g. alkylbenzenesulfonic acid salts, alkylsulfonic acid salts, alkylnaphthalenesulfonic acid salts, sulfosuccinic acid dialkyl ester type ones, hydrocarbon(e.g. alkane or α-olefin) sulfonic acid salts and Igepon T type ones]; and phosphate ester salts [e.g. higher alcohol (C8-60)-EO adduct phosphate ester salts and alkyl(C4-60)phenol-EO adduct phosphate ester salts].

The salts mentioned above include, for example, alkali metal (e.g. sodium, potassium) salts, alkaline earth metal (e.g. calcium, magnesium) salts, ammonium salts, alkylamine(C1-20) salts and alkanolamine(C2-12, e.g. mono-, di- or triethanolamine) salts.

As the cationic surfactants, there may be mentioned quaternary ammonium salt type ones [e.g. tetraalkyl(C4-100) ammonium salts (e.g. lauryltrimethylammonium chloride, didecyldimethylammonium chloride, dioctyldimethylammonium bromide, stearyltrimethylammonium bromide), trialkyl(C3-80)benzylammonium salts (e.g. lauryldimethylbenzylammonium chloride (benzalkonium chloride), alkyl (C2-60)pyridinium salts (e.g. cetylpyridinium chloride), polyoxyalkylene(C2-4)trialkylammonium salts (e.g. polyoxyethylenetrimethylammonium chloride) and Sapamine type quaternary ammonium salts (e.g. stearamidoethyldiethylmethylammonium methosulfate)); and amine salt type ones [higher aliphatic amine (C12-60, e.g. laurylamine, stearylamine, cetylamine, hardened beef tallow amine, rosin amine) inorganic acid (e.g. hydrochloric acid, sulfuric acid, nitric acid, phosphoric acid) salts or organic acid (C2-22, e.g. acetic acid, propionic acid, lauric acid, oleic acid, benzoic acid, succinic acid, adipic acid, azelaic acid) salts, aliphatic amine (C1-30) -EO adduct and like product inorganic acid (same as above) salts or organic acid (same as above) salts and tertiary amine (C4-30, e.g. triethanolamine monostearate, stearamidoethyldiethylmethylethanolamine) inorganic acid (same as above) salts or organic acid (same as above) salts].

As the amphoteric surfactants, there may be mentioned amino acid type amphoteric surfactants [e.g. higher alkylamine (C12-18) propionic acid sodium salt], betaine type amphoteric surfactants [e.g. alkyl(C12-18)dimethylbetaines], sulfate ester salt type amphoteric surfactants [e.g. higher alkyl(C8-18)amine sulfate ester sodium salts, hydroxyethylimidazoline sulfate ester sodium salt], sulfonate salt type amphoteric surfactants (e.g. pentadecylsulfotaurine, imidazolinesulfonic acid) and phosphate ester salt type amphoteric surfactants [e.g. glycerol higher fatty acid (C8-22)-derived esterification product phosphate ester amine salts].

The above-mentioned surfactants (C2) may be used singly or in combination of two or more of them.

Preferred among these from the viewpoint of the transparency, heat resistance and antistatic properties of the moldings are anionic surfactants, sulfonate salts are more preferred, and alkylbenzenesulfonic acid salts, alkylnaphthalenesulfonic acid salts, alkylsulfonic acid salts and hydrocarbonsulfonic acid salts are particularly preferred.

The amount of (C2) to be used based on the total weight of (A) and (B) is generally not higher than 15% and, from the viewpoint that it will not precipitate out on the resin surface but can give a good appearance and good antistatic properties to the moldings, it is preferably 0.001 to 12%, more preferably 0.01 to 10%, particularly preferably 0.1 to 8%.

The method of causing (C2) to be contained in the composition is not particularly restricted but causing (C2) to be contained in advance in (A) is preferred so that effective dispersion thereof in the resin composition may be attained. In the case of causing (C2) to be contained in (A) in advance, causing the same in (A) on the occasion of production (polymerization) thereof is preferred; the timing of addition is not particularly restricted but the addition may be made before, during or after polymerization; the addition before polymerization is preferred, however.

As the compatibilizers (C3), there may be mentioned, for example, modified vinyl polymers (e.g. those described in Japanese Kokai Publication Hei-03-258850) containing at least one kind of polar group selected from the group consisting of carboxyl, epoxy, amino, hydroxyl and polyoxyalkylene groups, sulfo group-containing modified vinyl polymers (e.g. those described in Japanese Kokai Publication Hei-06-345927), and block copolymers comprising a polyolefin block(s) and an aromatic vinyl polymer block(s).

The above-mentioned compatibilizers (C3) may be used singly or in combination of two or more of them. From the viewpoint of the transparency of the moldings, however, those differing in refractive index from (A) and (B) by not more than 0.01 are preferred.

The amount of (C3) to be used based on the total weight of (A) and (B) is generally not higher than 15% and, from the viewpoint of the compatibility with (A) and (B) and the mechanical properties of the moldings, it is preferably 0.1 to 12%, more preferably 1 to 10%, particularly preferably 1.5 to 8%.

The method of causing (C3) to be contained in the composition is not particularly restricted but causing the same to be contained in advance in (A) is preferred so that effective dispersion thereof in the resin composition may be attained. In the case of causing (C3) to be contained in (A) in advance, causing the same in (A) on the occasion of production (polymerization) thereof is preferred; the timing of addition is not particularly restricted but the addition may be made before, during or after polymerization; the addition after polymerization is preferred, however.

The ionic liquids (C4) are those compounds, other than the above-mentioned (C1) and (C2), which are ambient temperature molten salts having a melting point not higher than room temperature, containing an organic ion as at least one of the (C4)-constituting cation and anion and having an initial conductivity of 1 to 200 ms/cm (preferably 10 to 200 ms/cm), including the ambient temperature molten salts described in WO 95/15572, for instance. The (C4)-constituting cation is, for example, an amidinium cation, guanidinium cation or tertiary ammonium cation.

The amidinium cation includes, for example, imidazolinium cations [1,2,3,4-tetramethylimidazolinium, 1,3,4-trimethyl-2-ethylimidazolinium, 1,3-dimethylimidazolinium, 1,3-dimethyl-2,4-diethylimidazolinium, etc.], imidazolium cations [1,3-dimethylimidazolium, 1,3-diethylimidazolium, 1-ethyl-3-methylimidazolium, 1,2,3-trimethylimidazolium, etc.], tetrahydropyrimidinium cations [1,3-dimethyl-1,4,5,6-tetrahydropyrimidinium, 1,2,3-trimethyl-1,4,5,6-tetrahydropyrimidinium, 1,2,3,4-tetramethyl-1,4,5,6-tetrahydropyrimidinium, 1,2,3,5-tetramethyl-1,4,5,6-tetrahydropyrimidinium, etc.] and dihydropyrimidinium cations [1,3-dimethyl-1,4- or -1,6-dihydropyrimidinium, 1,2,3-trimethyl-1,4- or -1,6-dihydropyrimidinium, 1,2,3,4-tetramethyl-1,4- or -1,6-dihydropyrimidinium, etc.].

As the guanidinium cation, there may be mentioned, for example, imidazolinium skeleton-containing guanidinium cations [2-dimethylamino-1,3,4-trimethylimidazolinium, 2-diethylamino-1,3,4-trimethylimidazolinium, 2-diethylamino-1,3-dimethyl-4-ethylimidazolinium, 2-dimethylamino-1-methyl-3,4-diethylimidazolinium, etc.], imidazolium skeleton-containing guanidinium cations [2-dimethylamino-1,3,4-trimethylimidazolium, 2-diethylamino-1,3,4-trimethylimidazolium, 2-diethylamino-1,3-dimethyl-4-ethylimidazolium, 2-dimethylamino-1-methyl-3,4-diethylimidazolium, etc.], teterahydropyrimidinium skeleton-containing guanidinium cations [2-dimethylamino-1,3,4-trimethyl-1,4,5,6-teterahydropyrimidinium, 2-diethylamino-1,3,4-trimethyl-1,4,5,6-teterahydropyrimidinium, 2-diethylamino-1,3-dimethyl-4-ethyl-1,4,5,6-teterahydropyrimidinium, etc.], and dihydropyrimidinium skeleton-containing guanidinium cations [2-dimethylamino-1,3,4-trimethyl-1,4- or -1, 6-dihydropyrimidinium, 2-diethylamino-1,3,4-trimethyl-1,4- or -1,6-dihydropyrimidinium, 2-diethylamino-1,3-dimethyl-4-ethyl-1,4- or -1,6-dihydropyrimidinium, etc.].

As the tertiary ammonium cations, there may be mentioned, for example methyldilaurylammonium.

The above-mentioned amidinium cations, guanidinium cations and tertiary ammonium cations may be used singly or two or more species thereof may be used in combination.

From the initial conductivity viewpoint, amidinium cations are preferred among them, imidazolium cations are more preferred, and 1-ethyl-3-methylimidazolium cation is particularly preferred.

The anion-constituting organic acid or inorganic acid in the ionic liquids (C4) includes the following.

As the organic acid, there may be mentioned, for example, carboxylic acids, sulfate esters, higher alkyl ether sulfate esters, sulfonic acid esters and phosphate esters and, for example, those organic acids described hereinabove referring to (C2) and (C3) can be used.

As the inorganic acid, there may be mentioned, for example, superacids (e.g. hydroborofluoric acid, tetrafluoroboric acid, perchloric acid, hexafluorophosphoric acid, hexafluoroantimonic acid, hexafluoroarsenic acid), phosphoric acid and boric acid.

Those organic acids and inorganic acids mentioned above may be used singly or in combination of two or more.

Preferred among the organic acids and inorganic acids from the viewpoint of the initial conductivity of (C4) are those acids forming the conjugate base of a superacid or an anion other than conjugate bases of superacids, with the (C4) -constituting anion having a Hammett acidity function ($—H_0$) of 12 to 100, and mixtures thereof.

As the anion other than conjugate bases of superacids, there may be mentioned, for example, halide (e.g. fluoride, chloride, bromide) ions, alkyl(C1-12)benzenesulfonic acid (e.g. p-toluenesulfonic acid, dodecylbenzenesulfonic acid) ions and poly(n=1-25)fluoroalkanesulfonic acid (e.g. undecafluoropentanesulfonic acid) ions.

As the superacid, there may be mentioned protonic acids and those derived from protonic acid-Lewis acid combinations, and mixtures of these.

The protonic acid as superacids include, for example, bis(trifluoromethylsulfonyl)imidic acid, bis(pentafluoroethylsulfonyl)imidic acid, tris(trifluoromethylsulfonyl)methane, perchloric acid, fluorosulfonic acid, alkane(C1-30)sulfonic acids (e.g. methanesulfonic acid, dodecanesulfonic acid), poly(n=1-30)fluoroalkane(C1-30)sulfonic acids (e.g. trifluoromethanesulfonic acid, pentafluoroethanesulfonic acid, heptafluoropropanesulfonic acid, nonafluorobutanesulfonic acid, undecafluoropentanesulfonic acid, tridecafluorohexanesulfonic acid), hydroborofluoric acid and tetrafluoroboric acid.

Among these, hydroborofluoric acid, trifluoromethanesulfonic acid and bis(pentafluoroethylsulfonyl)imidic acid are preferred from the ease of synthesis viewpoint.

The protonic acid to be used in combination with a Lewis acid includes, for example, hydrogen halides (e.g. hydrogen fluoride, hydrogen chloride, hydrogen bromide, hydrogen iodide), perchloric acid, fluorosulfonic acid, methanesulfonic acid, trifluoromethanesulfonic acid, pentafluoroethanesulfonic acid, nonafluorobutanesulfonic acid, undecafluoropentanesulfonic acid, tridecafluorohexanesulfonic acid, and mixtures of these.

Among these, hydrogen fluoride is preferred from the viewpoint of the initial conductivity of (C4).

The Lewis acid includes, for example, boron trifluoride, phosphorus pentafluoride, antimony pentafluoride, arsenic pentafluoride, thallium pentafluoride, and mixtures of these.

Among these, boron trifluoride and phosphorus pentafluoride are preferred from the viewpoint of the initial conductivity of (C4).

The protonic acid-Lewis acid combination is arbitrary. As superacids resulting from such combination, there may be mentioned, for example, tetrafluoroboric-acid, hexafluorophosphoric acid, hexafluorothallic acid, hexafluoroantimonic acid, hexafluorothalliumsulfonic acid, tetrafluoroboric acid, hexafluorophosphoric acid, chlorotrifluoroboric acid, hexafluoroarsenic acid, and mixtures of these.

From the viewpoint of the initial conductivity of (C4), the conjugate bases of superacids (protonic acid-based superacids and superacids resulting from protonic acid-Lewis acid combinations) are preferred among the anions mentioned above, and the conjugate bases of protonic acid-based superacids and superacids composed of a protonic acid and boron trifluoride and/or phosphorus pentafluoride are more preferred.

The amount of (C4) to be used based on the total weight of (A) and (B) is generally not higher than 10% and, from the antistatic effect view point and from the viewpoint that (C4) will not migrate onto the moldings' surface but may give a good appearance to the moldings, it is preferably 0.001 to 5%, more preferably 0.01 to 3%.

The method of addition of (C4) is not particularly restricted but causing (C4) to be dispersed in (A) in advance is preferred from the viewpoint of effective dispersion thereof in the resin. The addition and dispersion of (C4) to and in (A) in advance after production (polymerization) thereof is more preferred.

As for the method of producing (C4), there may be mentioned, for example, the method comprising adding the acid [the above-mentioned organic or inorganic acid constituting an anion in (C4)] to an amidinium cation and/or guanidinium cation dimethyl carbonate salt obtainable by quaternization with dimethyl carbonate, for instance, to cause acid interchange, and the method comprising once hydrolyzing the amidinium cation and/or guanidinium cation for the formation of the corresponding monoamidoamine and then neutralizing the monoamidoamine with the acid (same as above).

In the resin composition of the invention, there may further be arbitrarily incorporated one or more of other resin additives (D) at addition levels not lessening the effects of the invention.

As (D), there may be mentioned electrically conductive materials (D1) colorants (D2), fillers (D3), nucleating agents (D4), lubricants (D5), plasticizers (D6), flame retardants (D7), dispersants (D8), mold release agents (D9), antioxidants (D10), ultraviolet absorbers (D11) and antimicrobial agents (D12).

As the conductive materials (D1), there may be mentioned conductive compounds or materials other than the above-mentioned (C1) and (C4), for example, carbon nanotubes, carbon black and white carbon.

As the colorants (D2), there maybe mentioned, for example, inorganic pigments, organic pigments and dyes.

As the inorganic pigments, there may be mentioned, for example, white pigments (e.g. titanium oxide, lithopone, white lead, zinc white), cobalt compounds (e.g. aureolin, cobalt green, cerulean blue, cobalt blue, cobalt violet), iron compounds (e.g. iron oxide, iron blue), chromium compounds (e.g. chromium oxide, lead chromate, barium chromate) and sulfides (e.g. cadmium sulfide, cadmium yellow, ultramarine).

As the organic pigments, there may be mentioned, for example, azo pigments (e.g. azo lake, monoazo, disazo and chelate azo pigments) and polycyclic pigments (e.g. benzimidazolone, phthalocyanine, quinacridone, dioxazine, isoindolinone, thioindigo, perylene, quinophthalone and anthraquinone pigments).

As the dyes, there may be mentioned, for example, azo, anthraquinone, indigoid, sulfur, triphenylmethane, pyrazolone, stilbene, diphenylmethane, xanthene, alizarin, acridine, quinonimine, thiazole, methine, nitro, nitroso and aniline dyes.

As the fillers (D3), there may be mentioned, for example, inorganic fillers (e.g. calcium carbonate, talc, clay, silicic acid, silicate salts, asbestos, mica, glass fibers, glass balloons, carbon fibers, metal fibers, ceramic whiskers, titanium whiskers) and organic fillers [e.g. urea, calcium stearate, organic crosslinked fine particles (e.g. epoxy and urethane type ones)].

As the nucleating agents (D4), there may be mentioned, for example, dibenzylidenesorbitol.

As the lubricants (D5), there may be mentioned, for example, hydrocarbons (Mn 200 to 3,000, e.g. liquid paraffin, natural paraffin, micro wax, polyethylene wax), fatty acids [C12-20, e.g. higher fatty acids (e.g. stearic acid, hydroxy fatty acids)], fatty acid amides [C8-40, e.g. stearamide, palmitamide, methylenebisstearamide], and esters [e.g. fatty acid (C8-20) lower alcohol (C2-18) esters [e.g. butyl stearate], fatty acid (C8-20) polyhydric (di- to pentahydric) alcohol (C2-18) esters [e.g. hardened castor oil] and fatty acid (C8-20) glycol (C2-18) esters [e.g. ethylene glycol monostearate].

As the plasticizers (D6), there may be mentioned, for example, monocarboxylic acid esters [C10-30, e.g. fatty acid esters (e.g. butyl stearate, methoxyethyl oleate), aromatic carboxylate esters (C18-30, e.g. diethylene glycol dibenzoate, triethylene glycol dibenzoate)]; dicarboxylic acid esters [e.g. aromatic dicarboxylic acid esters [C10-40, e.g. phthalate esters (e.g. dibutyl phthalate, di-2-ethylhexyl phthalate)], aliphatic dicarboxylic acid esters [C10-40, e.g. adipate esters (e.g. di-2-ethylhexyl adipate, diisodecyl adipate), azelate esters (e.g. di-n-hexyl azelate, di-2-ethylhexyl azelate), sebacate esters (e.g. dibutyl sebacate, di-2-ethylhexyl sebacate)]; tricarboxylic acid esters [e.g. aliphatic tricarboxylic acid esters [C9-60, e.g. citrate esters (e.g. triethyl citrate, tributyl acetylcitrate)]; epoxides (C10-40, e.g. epoxidized soybean oil, di-2-ethylhexyl 4,5-epoxycyclohexane-1, 2-dicarboxylate); phosphate esters (C10-30, e.g. tributyl phosphate, tributoxyethyl phosphate, trichloroethyl, phosphate); and chlorine-containing hydrocarbons [C10-30, e.g. aromatic hydrocarbons (e.g. chlorinated naphthalene, chlorinated diphenyl) and chlorinated paraffin].

As the flame retardants (D7), there may be mentioned phosphate esters [e.g. tricresyl phosphate, tris(2,3-dibromopropyl)phosphate], bromides (e.g. decabromobiphenyl ether, tetrabromobisphenol A), antimony trioxide, magnesium hydroxide, borate salts (e.g. zinc borate, barium metaborate), aluminum hydroxide, red phosphorus, ammonium polyphosphate, and HET acid.

As the dispersants (D8), there may be mentioned dispersants with a Mn of 1,000 to 100,000, for example naphthalenesulfonic acid-formalin condensates (Mn 1,000 to 10,000), polystyrenesulfonic acid metal salts [e.g. alkali metal (e.g. sodium, potassium) salts] (Mn 1,000 to 100,000), polyacrylic acid metal salts [e.g. alkali metal (same as above) salts] (Mn 2,000 to 50,000), carboxymethylcellulose and polyvinyl alcohol.

As the mold release agents (D9), there may be mentioned, for example, straight silicone oils (e.g. dimethylpolysiloxane and methylphenylpolysiloxane with a Mn of 800 to 500,000) and organic group-modified silicone oils (e.g. polyoxyalkylene-, hydroxyl-, amino-, epoxy-, carboxyl- and/or mercapto-containing silicone oils with a Mn of 800 to 50,000).

As the antioxidants (D10), there may be mentioned phenolics [e.g. 2,6-di-tert-butyl-p-cresol (BHT), 2,2'-methylenebis(4-methyl-6-tert-butylphenol), tetrakis[methylene(3, 5-di-tert-butyl-4-hydroxyhydrocinnamate)]methane (product name: Irganox 1010, product of Ciba Specialty Chemicals), sulfides [e.g. dilauryl 3,3'-thiodipropionate (DLTDP), distearyl 3,3'-thiodipropionate (DSTDP)], phosphorus-containing ones [e.g. triphenyl phosphite (TPP), triisodecyl phosphite (TDP), tris(2,4-di-tert-butylphenyl)phosphite, mono- or distearyl acid phosphate] and amines [e.g. octylated diphenylamine, N-n-butyl-p-aminophenol, N,N-di-isopropyl-p-phenylenediamine].

As the ultraviolet absorbers (D11), there may be mentioned benzophenones (e.g. 2-hydroxybenzophenone, 2,4-dihydroxybenzophenone), salicylates (e.g. phenyl salicylate, 2,4-di-tert-butylphenyl 3,5-di-tert-butyl-4-hydroxybenzoate), benzotriazoles [e.g. (2'-hydroxyphenyl)benzotriazole, (2'-hydroxy-5'-methylphenyl)benzotriazole] and acrylates [e.g.

ethyl 2-cyano-3,3-diphenylacrylate, methyl 2-carbomethoxy-3-(paramethoxybenzyl)acrylate].

As the antimicrobial agents (D12), there may be mentioned isothiazolone compounds, halogenated aliphatic nitro compounds (e.g. 2-bromo-2-nitro-1,3-propanediol, 2,2-dibromo-2-nitroethanol), esters of such nitro compounds, dibromonitrilepropionamide, alkylene bisthiocyanates (e.g. methylene bisthiocyanate), 1,4-bisbromoacetoxy-2-butene, hexabromodimethyl sulfone, isophthalonitrile compounds (e.g. 5-chloro-2,4,6-trifluoroisophthalonitrile, tetrachloroisophthalonitrile), dimethyldithiocarbamates, 4,5-dichloro-1,2-diol-3-one, 3,3,4,4-tetrachlorotetrahydrothiophene 1,1-dioxide, triiodoallyl alcohol, bromonitrostyrene, aldehyde compounds (e.g. glutaraldehyde, phthalaldehyde, isophthalaldehyde, terephthalaldehyde), dichloroglyoxime, benzaldoxime compounds (e.g. α-chlorobenzaldoxime, α-chlorobenzaldoxime acetate) and halogenated hydantoin compounds (e.g. 1,3-dichloro-5,5-dimethylhydantoin, 1,3-dibromo-5,5-dimethylhydantoin).

The amount of the additives (D) to be used as a whole is generally not higher than 20% based on the total weight of (A) and (B). For each of (D3), (D6), (D7), (D8) and (D12), the amount is generally not higher than 10%, preferably 1 to 5%; for each of (D1) and (D2), it is generally not higher than 5%, preferably 0.1-to 3%; for each of (D4), (D5), (D9), (D10) and (D11), it is generally not higher than 2%, preferably 0.01 to 0.5%.

As a method of producing the transparent resin composition of the invention, there may be mentioned the method comprising mixing (A) and (B) by melting, if necessary after adding (C) and/or (D) thereto [(C) may be added to (A) in advance from the effective dispersion viewpoint, as mentioned hereinabove].

As for the method of melt mixing, there may be mentioned, for example, the method comprising mixing the components in pellet or powder form in an appropriate mixer (e.g. Henschel mixer) and then melting (150 to 260° C.) the mixture in an extruder for thorough mixing, followed by pelletization.

The order of addition of the respective components in the step of mixing is not particularly restricted but there may be mentioned, for example, (1) the method comprising blending and kneading (A) and (B) all at once, if necessary after addition of (C) and/or (D), and (2) the method comprising blending and kneading (A) and a part of (B), if necessary after addition of (C) and/or (D) and then blending and kneading the resulting mixture with the remaining portion of (B).

Among these methods, the method (2) is called "masterbatch method" or "master pellet method" and is preferred from the viewpoint of attaining uniform dispersion of a small amount(s) of (C) and/or (D) in the resins.

[5] Molded Articles or Moldings Made of the Transparent Resin Composition

As for the method of molding the transparent resin composition of the invention, there may be mentioned, for example, the injection molding, compression molding, calendering, slush molding, rotational molding, extrusion molding, blow molding and film forming (e.g. casting, tentering, inflation) methods, and an appropriate method can be selected arbitrarily according to the intended purpose.

From the transparency viewpoint, the moldings obtainable by molding the transparent resin composition of the invention preferably have a haze not exceeding 20%, more preferably not exceeding 10%, still more preferably not exceeding 7%, most preferably not exceeding 5%. The haze refers to the value obtainable by carrying out the measurement according to JIS K 7105 (1981). As an apparatus suited for that measurement, there may be mentioned, for example, the Nippon Denshoku Kogyo model ND-300A apparatus.

The moldings obtainable by molding the transparent composition of the invention can give molded products upon further coating and/or printing.

The method of coating the moldings includes, but is not limited to, air spray coating, airless spray coating, electrostatic spray coating, dip coating, roller coating and brushing.

The coating composition or paint includes those generally used in coating plastics, for example polyester-melamine resin paints, epoxy-melamine resin paints, acrylic-melamine resin paints, acrylic-urethane resin paints, and the like.

The coating thickness (coat film thickness after drying) can be appropriately selected according to the intended purpose. Generally, it is 10 to 50 μm and, from the viewpoint of the mechanical properties of the coatings, it is preferably 15 to 40 μm.

The method of printing the moldings may be any of those methods of printing which are generally used in printing plastics. Thus, for example, mention may be made of gravure printing, flexography, screen printing, pad printing, dry offset printing and offset printing.

Usable as the printing ink are those used in printing plastics, for example gravure ink, flexographic ink, screen ink, pad ink, dry offset ink and offset ink.

Furthermore, the polymer (A) can also added to coating compositions or supplemented with a solvent (e.g. xylene, toluene) to provide coating compositions for antistatic purposes.

As the coating compositions or paints, there may be mentioned those mentioned hereinabove, and the like.

When (A) is added to a coating composition, the amount thereof, from the antistatic properties viewpoint, is preferably 5 to 60%, more preferably 10 to 50%, particularly preferably 15 to 40%, based on the solid matter weight in the coating composition.

When (A) is diluted with a solvent to give a coating composition, the concentration of (A), from the antistatic properties viewpoint, is preferably 20 to 60% by weight, more preferably 25 to 55% by weight, particularly preferably 30 to 50% by weight.

The moldings obtainable by molding the transparent resin composition of the invention are very useful since they have the following advantages:

(1) They are excellent in permanent antistatic properties, mechanical properties and water resistance.
(2) They have such a high level of transparency that the prior art cannot attain.
(3) They are excellent in paintability and printability.

BEST MODES FOR CARRYING OUT THE INVENTION

The following examples illustrate the present invention more specifically. These examples are, however, by no means limitative of the scope of the invention. In the examples, "part(s)" means "part(s) by weight".

The mechanical properties of each polymer as reported herein were measured in the following manner.

(1) Mn

Measurements were made by the GPC method under the following conditions:

Apparatus: High temperature gel permeation chromatograph; solvent: orthodichlorobenzene; standard substances: polystyrene species; sample concentration: 3 mg/ml; column stationary phase: PLgel MIXED-B; column temperature: 135° C.

(2) Refractive index

Measurements were made according to JIS K 7142 (1996) using Abbe's refractometer.

(3) SP values

SP values were calculated by the Fedors method (Polymer Engineering and Science, vol. 14, p. 152).

(4) Volume resistivity

Each test specimen (100×100×2 mm) prepared by compression or injection molding at 130 to 280° C. was conditioned in an atmosphere of 23° C. and 50% RH (relative humidity) for 48 hours. The test specimen was subjected to measurement in an atmosphere of 23° C. and 50% RH using a superinsulation resistance meter [Toa Denpa Kogyo model DSM-8103 (SME-8310 electrodes for flat sheet specimens)] [according to ASTM D 257 (1984)].

(5) Thermal Degradation Temperature

A 10-g portion of each hydrophilic block (b) was placed in a dish with a diameter of 70 mm and a depth of 20 mm, and dried in a vacuum drier for 2 hours under the conditions of 80±5° C. and a reduced pressure of not higher than 1.3 kPa. The block sample was then allowed to stand in a 3-L desiccator containing 200 g of silica gel for 60 minutes and thus cool to 23° C., and then subjected to measurement. A 50-mg portion of the measurement sample was weighed in a sample vessel, the whole was placed on a thermobalance and, after an hour of passage of dry air at 23° C. at a flow rate of 100 ml/minute, the TG-DTA measurement was carried out in accordance with the method of thermogravimetry of plastics as described in JIS K 7120 (1987). The thermal degradation temperature is the value obtained in accordance with the method of analyzing TG curves as described in JIS K 7120 (1987), Section 8. The apparatus used was the Rikagaku Kikai model TG-8110 (sample holder unit: alumina/platinum thermocouple; protective tube: made of quartz; sample vessel: 5.2 mm in outside diameter, 2.5 mm in height, made of-alumina or platinum-rhodium alloy).

PRODUCTION EXAMPLE 1

A stainless steel autoclave was charged with 100 parts of a mixed solvent composed of acetonitrile and methanol (mixing ratio=50 parts/50 parts; hereinafter the same shall apply) and, after substitution of nitrogen gas for the autoclave inside atmosphere, the contents were heated to a temperature of 100° C. under pressure and tight closure. Then, a monomer mixture composed of 70 parts of styrene and 18 parts of vinylnaphthalene and a solution of 10 parts of a carboxyl group-terminated polymerization initiator [product name: V501, product of Wako Pure Chemical Industries; hereinafter the same shall apply] in 100 parts of the acetonitrile/methanol mixed solvent were added dropwise simultaneously over 1 hour and, then, the whole mixture was stirred at 100° C. for 1 hour. Thereafter, the solvent was distilled off under reduced pressure to give 95 parts of a styrene-vinylnaphthalene copolymer (a-1). The Mn of (a-1) was 1,730, the volume resistivity thereof was $8 \times 10^{14}$ Ω·cm, and the refractive index thereof was 1.657.

PRODUCTION EXAMPLE 2

The procedure of Production Example 1 was followed in the same manner except that styrene, vinylnaphthalene and the polymerization-initiator were used in amounts of 60 parts, 27 parts and 13 parts, respectively, whereby 95 parts of a styrene-vinylnaphthalene copolymer (a-2) was obtained. The Mn of (a-2) was 1,740, the volume resistivity thereof was $5 \times 10^{14}$ Ω·cm, and the refractive index thereof was 1.708.

PRODUCTION EXAMPLE 3

A stainless steel autoclave was charged with 53 parts of (a-1), 47 parts of a hydrophilic polymer (b-1) (volume resistivity: $2 \times 10^8$ Ω·cm; thermal degradation temperature: 280° C.) prepared by cyanoalkylating both the terminal hydroxyl groups of a bisphenol A-EO adduct (Mn: 1,500), followed by modifying the resulting terminal cyanoalkyl groups into primary amino groups by reduction, and 0.5 part of dibutyltin oxide, and the polymerization reaction was allowed to proceed at 245° C. under a reduced pressure of not higher than 0.13 kPa for 5 hours, to give a viscous polymer. This polymer was taken out, in the form of a strand, onto a belt and pelletized. The thus-obtained polymer [A1] had a refractive index of 1.583, an SP value of 10.4 and a Mn of 13,000.

PRODUCTION EXAMPLE 4

A stainless steel autoclave was charged with 49 parts of (a-2), 47 parts of a hydrophilic polymer (b-2) (volume resistivity: $1 \times 10^8$ Ω·cm; thermal degradation temperature: 280° C.) prepared by cyanoalkylating both the terminal hydroxyl groups of a bisphenol A-EO adduct (Mn: 1,800), followed by modifying the resulting terminal cyanoalkyl groups into primary amino groups by reduction, and 0.5 part of dibutyltin oxide, and the polymerization reaction was allowed to proceed at 245° C. under a reduced pressure of not higher than 0.13 kPa for 5 hours, to give a viscous polymer. Thereafter, this was pelletized in the same manner as in Production Example 3. The thus-obtained block polymer [A2] had a refractive index of 1.594, an SP value of 10.4 and a Mn of 10,600.

PRODUCTION EXAMPLE 5

A stainless steel autoclave was charged with 38 parts of dimethyl 2,6-naphthalenedicarboxylate (volume resistivity: $5 \times 10^4$ Ω·cm), 8 parts of ethylene glycol and 0.5 part of zinc acetate, and the temperature was raised to 210° C. while a predetermined amount of methanol was distilled off. After cooling to room temperature, 40 parts of a bisphenol A-EO adduct (Mn: 1,700; volume resistivity: $1 \times 10^8$ Ω·cm; thermal degradation temperature: 280° C.; refractive index; 1.488) (b-3) was added, and the polymerization reaction was allowed to proceed with stirring and mixing at 250° C. under a reduced pressure not exceeding 0.13 kPa for 5 hours, to give a viscous polymer. Thereafter, this was pelletized in the same manner as in Production Example 3. The thus-obtained block polymer [A3] had a refractive index of 1.587, an SP value of 11.5 and a Mn of 10,000.

PRODUCTION EXAMPLE 6

A stainless steel autoclave was charged with 39 parts of (a-1), 40 parts of a bisphenol A-EO adduct (b-3), 21 parts of a polycarbonate resin [product name: Novarex 7025A, product of Mitsubishi Engineering-Plastics Corp.; same as [B1] described later herein; hereinafter the same shall apply] and 0.5 part of dibutyltin oxide, all at once, and the polymerization reaction was allowed to proceed with stirring and mixing at 245° C. under a reduced pressure not exceeding 0.13 kPa for 5 hours, to give a viscous polymer. Thereafter, this was pelletized in the same manner as in Production Example 3. The thus-obtained block polymer [A4] had a refractive index of 1.583, an SP value of 10.4 and a Mn of 11,000.

PRODUCTION EXAMPLE 7

A stainless steel autoclave was charged with 38 parts of dimethyl 2,6-naphthalenedicarboxylate, 8 parts of ethylene glycol and 0.5 part of zinc acetate, and the temperature was raised to 210° C. while a predetermined amount of methanol was distilled off. After cooling to room temperature, 40 parts of the bisphenol A-EO adduct (b-3) and 13 parts of the polycarbonate resin were added, and the polymerization reaction was allowed to proceed with stirring and mixing at 250° C. under a reduced pressure not exceeding 0.13 kPa for 5 hours, to give a viscous polymer. Thereafter, this was pelletized in the same manner as in Production Example 3. The thus-obtained block polymer [A5] had a refractive index of 1.587, an SP value of 11.5 and a Mn of 10,500.

PRODUCTION EXAMPLE 8

The procedure of Production Example 7 was followed in the same manner except that dimethyl 2,6-napthalenedicarboxylate, ethylene glycol and (b-3) were used in amounts of 37 parts, 8 parts and 43 parts, respectively, and that a polyethylene terephthalate resin [product name: Vylopet EMC307, product of Toyobo Co.; same as [B2] referred to later herein] was used in lieu of the polycarbonate resin and zirconyl acetate in lieu of zinc acetate. The thus-obtained pelletized block polymer [A6] had a refractive index of 1.574, an SP value of 11.5 and a Mn of 11,000.

PRODUCTION EXAMPLE 9

A stainless steel autoclave was charged with 47 parts of dimethyl 2,6-naphthalenedicarboxylate, 10 parts of ethylene glycol and 0.5 part of zirconyl acetate, and the temperature was raised to 230° C. while a predetermined amount of methanol was distilled off. After cooling to room temperature, 42 parts of a bisphenol A-EO adduct (Mn: 2,000; volume resistivity: $1 \times 10^8$ Ω·cm; thermal degradation temperature: 280° C.; refractive index 1.462) (b-4) was added, and the polymerization reaction was allowed to proceed with stirring and mixing at 250° C. under a reduced pressure not exceeding 0.13 kPa for 5 hours, to give a viscous polymer. Thereafter, this was pelletized in the same manner as in Production Example 3. The thus-obtained block polymer [A7] had a refractive index of 1.588, an SP value of 11.7 and a Mn of 9,000.

PRODUCTION EXAMPLE 10

A stainless steel autoclave was charged with 91.9 parts of caprolactam, 18.2 parts of terephthalic acid, 0.3 part of an antioxidant [product name: Irganox 1010, product of Ciba Specialty Chemicals; hereinafter the same shall apply] and 7 parts of water, all at once, and, after nitrogen substitution for the autoclave inside atmosphere, the mixture was stirred at 220° C. under tight closure and pressurization (0.3 to 0.5 MPa) for 4 hours, to give 106 parts of a polyamide (x-1) (refractive index: 1.530) having carboxyl groups at both termini and having an acid value of 112.

Another stainless steel autoclave was charged with 434 parts of dimethyl 2,6-naphthalenedicarboxylate, 600 parts of ethylene glycol and 0.5 part of zinc acetate, and the temperature was raised to 210° C. while a predetermined amount of methanol was distilled off. After cooling to room temperature, 389 parts of the bisphenol A-EO adduct (b-3), 96 parts of (x-1) and 5 parts of zirconyl acetate were added, and the polymerization reaction was allowed to proceed at 245° C. under a reduced pressure not exceeding 0.13 kPa for 5 hours, to give a viscous polymer. Thereafter, this was pelletized in the same manner as in Production Example 3. The thus-obtained block polymer [A8] had a refractive index of 1.570, an SP value of 11.9 and a Mn of 13,000.

PRODUCTION EXAMPLE 11

The procedure of Production Example 1 was followed in the same manner except that styrene, vinylnaphthalene and the initiator were used in amounts of 73 parts, 11 parts and 16 parts, respectively, whereby 95 parts of a styrene-vinylnaphthalene copolymer (a-3) was obtained. The Mn of (a-3) was 1,400, the volume resistivity thereof was $1 \times 10^{15}$ Ω·cm, and the refractive index thereof was 1.612.

PRODUCTION EXAMPLE 12

A stainless steel autoclave was charged with 44 parts of (a-3), 56 parts of a bisphenol A-EO adduct (volume resistivity: $1 \times 10^8$ Ω·cm; thermal degradation temperature: 280° C.) (b-5) with a Mn of 1,800 and 0.5 part of dibutyltin oxide, and the polymerization reaction was allowed to proceed at 245° C. under a reduced pressure not exceeding 0.13 kPa for 5 hours, to give a viscous polymer. Thereafter, this was pelletized in the same manner as in Production Example 3. The thus-obtained block polymer [A9] had a refractive index of 1.528, an SP value of 10.1 and a Mn of 13,000.

PRODUCTION EXAMPLE 13

A stainless steel autoclave was charged with 40 parts of (a-3), 51 parts of the bisphenol A-EO adduct (b-5), 10 parts of the polycarbonate resin and 0.5 part of dibutyltin oxide, all at once, and the polymerization reaction was allowed to proceed with stirring and mixing at 245° C. under a reduced pressure not exceeding 0.13 kPa for 5 hours, to give a viscous polymer. Thereafter, this was pelletized in the same manner as in Production Example 3. The thus-obtained block polymer [A10] had a refractive index of 1.539, an SP value of 10.1 and a Mn of 11,000.

PRODUCTION EXAMPLE 14

A stainless steel autoclave was charged with 96 parts of the polyamide (x-1), 192 parts of the bisphenol A-EO adduct (b-4) and 0.5 part of zirconyl acetate, and the polymerization reaction was allowed to proceed at 245° C. under a reduced pressure not exceeding 0.13 kPa for 5 hours, to give a viscous polymer. Thereafter, this was pelletized in the same manner as in Production Example 3. The thus-obtained block polymer [A11] had a refractive index of 1.503, an SP value of 10.1 and a reduced viscosity of 2.10 (ηsp/C, C=0.5% by weight, solution in m-cresol, 25° C.; hereinafter the same shall apply).

PRODUCTION EXAMPLE 15

A stainless steel autoclave was charged with 105 parts of ε-caprolactam, 17.1 parts of adipic acid, 0.3 part of the antioxidant and 6 parts of water, all at once, and, after nitrogen substitution for the autoclave inside atmosphere, the mixture was stirred at 220° C. under tight closure and pressurization (0.3 to 0.5 MPa) for 4 hours, to give 117 parts of a polyamide (refractive index: 1.524) having carboxyl groups at both termini and having an acid value of 110. Then, 225 parts of the bisphenol A-EO adduct (b-4) and 0.5 part of zirconyl acetate, and the polymerization reaction was allowed to proceed at 245° C. under a reduced pressure not exceeding 0.13 kPa for 5 hours, to give a viscous polymer. Thereafter, this was pelletized in the same manner as in Production Example 3. The thus-obtained block polymer [A12] had a refractive index of 1.500, an SP value of 10.6 and a reduced viscosity of 2.15.

PRODUCTION EXAMPLE 16

A reaction vessel equipped with a rectification column and a stirrer was charged with 1,074 parts of dimethyl 2,6-naphthalanedicarboxylate, 381 parts of dimethyl 4-sulfo-2,6-naphthalenedicarboxylate sodium salt, 910 parts of 1,6-hexamethylene glycol, 750 parts of polyethylene glycol with a Mn of 2,000 and 1.3 parts of tetrabutyl titanate and, after nitrogen substitution for the vessel inside atmosphere, the temperature was raised to 220° C. at ordinary pressure. The reaction was allowed to proceed at 220° C. for 5 hours while the by product methanol was distilled off. The reaction mixture was then placed in a stainless steel autoclave equipped with a stirrer, and the temperature was raised to 240° C. within 45 minutes. The system inside was placed under reduced pressure and, 60 minutes later, the pressure inside the system was reduced to 0.2 mmHg. After further 150 minutes, a viscous polymer was obtained. This was pelletized in the same manner as in Production Example 3. The thus-obtained polymer [A13] had a refractive index of 1.577, an SP value of 11.9 and a Mn of 9,000.

PRODUCTION EXAMPLE 17

A reaction vessel made of polytetrafluoroethylene was charged with 128 parts of methanol and then 20 parts of anhydrous hydrogen fluoride was blown into the methanol at ordinary pressure and at a temperature of 20 to 30° C. over about 30 minutes for absorption thereof in the methanol. Then, 131.9 parts of $BF_3$-dimethanol complex ($BF_3$ content: 51.4%) was added dropwise at 30 to 40° C. over about 30 minutes and, then, 372 parts of a solution of 1-ethyl-3-methylimidazolium methyl carbonate in methanol (concentration: 50%) was added dropwise over about 30 minutes. The reaction was allowed to proceed under generation of the reaction by product carbon dioxide. After cessation of the carbon dioxide generation, the solvent and other unnecessary materials were all removed under reduced pressure at 60 to 70° C. over about 1 hour. A colorless transparent liquid remained in the reaction vessel. NMR analysis revealed that the liquid obtained was 1-ethyl-3-methylimidazolium tetrafluoroborate [C2], an ionic liquid. The yield was 99%. The water content of the liquid was measured and found to be 200 ppm.

EXAMPLES 1 TO 14 AND COMPARATIVE EXAMPLES 1 TO 6

Accordance to the formulations given in Table 1 or 2, one of the block polymers [A1] to [A13] was blended with a transparent resin [[B1], [B2] or [B3] mentioned later herein] in a Henschel mixer for 3 minutes and then melt-kneaded in a vented twin-screw extruder under the conditions of a rotational speed of 100 rpm and a residence time of 3 minutes at 240° C. in the case of using [B1] or [B2] or at 220° C. in the case of using [B3]. Resin compositions (Examples 1 to 14 and Comparative Examples 1 to 6) were thus obtained.

TABLE 1

| | | | Refractive index | SP value | Example 1 | 2 | 3 | 4 | 5 | 6 | 7 |
|---|---|---|---|---|---|---|---|---|---|---|---|
| Formulation <part(s)> | Block polymer or polymer (A) | A1 | 1.583 | 10.4 | 10 | | | | | | |
| | | A2 | 1.594 | 10.4 | | 10 | | | | | |
| | | A3 | 1.587 | 11.5 | | | 10 | | | | |
| | | A4 | 1.583 | 10.4 | | | | 10 | | | |
| | | A5 | 1.587 | 11.5 | | | | | 10 | | |
| | | A6 | 1.574 | 11.5 | | | | | | 10 | |
| | | A7 | 1.588 | 11.7 | | | | | | | 10 |
| | | A8 | 1.570 | 11.9 | | | | | | | |
| | | A9 | 1.528 | 10.1 | | | | | | | |
| | | A10 | 1.539 | 10.1 | | | | | | | |
| | | A11 | 1.503 | 10.1 | | | | | | | |
| | | A12 | 1.500 | 10.6 | | | | | | | |
| | | A13 | 1.577 | 11.9 | | | | | | | |
| | Transparent resin (B) | B1 | 1.585 | 11.2 | 90 | | | 90 | 90 | 90 | 90 |
| | | B2 | 1.576 | 12.4 | | | | | | 90 | |
| | | B3 | 1.592 | 10.6 | | 90 | | | | | |
| | Addidve (C) | C1 | | | | | | | | | |
| | | C2 | | | | | | | | | |
| | Additive (D) | D1 | | | | | | | | | |
| | | D2 | | | | | | | | | |
| | Difference in refractive index (A) − (B) | | | | −0.002 | 0.002 | 0.002 | −0.002 | 0.002 | −0.002 | 0.003 |
| | Difference in SP value (A) − (B) | | | | −0.8 | −0.2 | 0.3 | −0.8 | 0.3 | −0.9 | 0.5 |

| | | | Refractive index | SP value | Example 8 | 9 | 10 | 11 | 12 | 13 | 14 |
|---|---|---|---|---|---|---|---|---|---|---|---|
| Formulation <part(s)> | Block polymer or polymer (A) | A1 | 1.583 | 10.4 | | | | | | | |
| | | A2 | 1.594 | 10.4 | | | | | | | |
| | | A3 | 1.587 | 11.5 | | | 10 | 10 | 10 | | |
| | | A4 | 1.583 | 10.4 | | | | | | | |
| | | A5 | 1.587 | 11.5 | | | | | | | |
| | | A6 | 1.574 | 11.5 | | | | | | 10 | 10 |
| | | A7 | 1.588 | 11.7 | | | | | | | |
| | | A8 | 1.570 | 11.9 | 10 | 10 | | | | | |
| | | A9 | 1.528 | 10.1 | | | | | | | |

TABLE 1-continued

|  |  |  |  |  |  |  |  |  |  |
|---|---|---|---|---|---|---|---|---|---|
|  | A10 | 1.539 | 10.1 |  |  |  |  |  |  |
|  | A11 | 1.503 | 10.1 |  |  |  |  |  |  |
|  | A12 | 1.500 | 10.6 |  |  |  |  |  |  |
|  | A13 | 1.577 | 11.9 |  |  |  |  |  |  |
| Transparent | B1 | 1.585 | 11.2 |  |  | 90 | 90 | 90 |  |  |
| resin (B) | B2 | 1.576 | 12.4 | 90 | 90 |  |  |  | 90 | 90 |
|  | B3 | 1.592 | 10.6 |  |  |  |  |  |  |  |
| Additive | C1 |  |  |  | 0.4 | 0.4 |  |  |  |  |
| (C) | C2 |  |  |  |  |  | 0.4 |  | 0.4 |  |
| Additive | D1 |  |  |  |  |  |  | 0.2 |  | 0.2 |
| (D) | D2 |  |  |  |  |  |  | 0.02 |  | 0.02 |
| Difference in refractive index (A) − (B) |  |  |  | −0.006 | −0.006 | 0.002 | 0.002 | 0.002 | −0.002 | −0.002 |
| Difference in SP value (A) − (B) |  |  |  | −0.5 | −0.5 | 0.3 | 0.3 | 0.3 | −0.9 | −0.9 |

TABLE 2

|  |  |  | Refractive index | SP value | Comparative Example | | | | | |
|---|---|---|---|---|---|---|---|---|---|---|
|  |  |  |  |  | 1 | 2 | 3 | 4 | 5 | 6 |
| Formulation <part(s)> | Block polymer or polymer (A) | A1 | 1.583 | 10.4 |  |  |  |  |  |  |
|  |  | A2 | 1.594 | 10.4 |  |  |  |  |  |  |
|  |  | A3 | 1.587 | 11.5 |  |  |  |  |  |  |
|  |  | A4 | 1.583 | 10.4 |  |  |  |  |  |  |
|  |  | A5 | 1.587 | 11.5 |  |  |  |  |  |  |
|  |  | A6 | 1.574 | 11.5 |  |  |  |  |  |  |
|  |  | A7 | 1.588 | 11.7 |  |  |  |  |  |  |
|  |  | A8 | 1.570 | 11.9 |  |  |  |  |  |  |
|  |  | A9 | 1.528 | 10.1 | 10 |  |  |  |  |  |
|  |  | A10 | 1.539 | 10.1 |  | 10 |  |  |  |  |
|  |  | A11 | 1.503 | 10.1 |  |  | 10 | 10 |  |  |
|  |  | A12 | 1.500 | 10.6 |  |  |  |  | 10 |  |
|  |  | A13 | 1.577 | 11.9 |  |  |  |  |  | 10 |
| Transparent resin (B) | B1 | 1.585 | 11.2 | 90 | 90 |  |  | 90 | 90 |
|  | B2 | 1.576 | 12.4 |  |  |  | 90 |  |  |
|  | B3 | 1.592 | 10.6 |  |  | 90 |  |  |  |
| Additive (C) | C1 |  |  |  |  |  |  |  |  |
|  | C2 |  |  |  |  |  |  |  |  |
| Additive (D) | D1 |  |  |  |  |  |  |  |  |
|  | D2 |  |  |  |  |  |  |  |  |
| Difference in refractive index (A) − (B) |  |  |  | −0.057 | −0.046 | −0.089 | −0.073 | −0.085 | −0.008 |
| Difference in SP value (A) − (B) |  |  |  | −1.1 | −1.1 | −0.5 | −2.3 | −0.6 | 0.7 |

[B1]: Polycarbonate resin [product name: Novarex 7025A, product of Mitsubishi Engineering Plastics; refractive index 1.585, SP value 11.2]
[B2]: Polyethylene terephthalate resin [product name: Vylopet EMC 307, product of Toyobo Co.; refractive index 1.576, SP value 12.4]
[B3]: Polystyrene resin [product name: Asaflex 805, product of Asahi Chemical Industry; refractive index 1.592, SP value 10.6]
[C1]: Sodium dodecylbenzenesulfonate [added on the occasion of block polymer production, namely on the occasion of polyamide production in producing [A8] in Example 9 or on the occasion of addition of (b-3) in producing [A3] in Example 10]
[C2]: 1-Ethyl-3-methylimidazolium tetrafluoroborate [in Example 11, [A3], after production thereof, was kneaded with
[C2] in a vented twin-screw extruder under the conditions of a rotational speed of 100 rpm, a residence time of 3 minutes and a temperature of 200° C. and, in Example 13, [A6], after production thereof, was kneaded with [C2] under the condition same as the above one].
[D1]: Mono- and distearyl acid phosphate (added on the occasion of kneading in the twin-screw extruder) [product name: Adekastab AX-71, product of Asahi Denka Kogyo]
[D2]: Tris(2,4-di-tert-butylphenyl) phosphite (added on the occasion of kneading in the twin-screw extruder) [product name: Adekastab 2112, product of Asahi Denka Kogyo]

Performance Tests

The resin compositions obtained in the above manner were respectively formed into moldings using an injection molding machine [PS40E5ASE, product of Nissei Plastic Industrial Co.]. The predetermined cylinder temperature was 250° C. for the [B1]-containing resin compositions, 240° C. for the [B2]-containing resin compositions or 230° C. for the [B3]-containing resin compositions, and the predetermined mold temperature was 110° C. for the [B1]-containing resin compositions, 90° C. for the [B2]-containing resin compositions or 50° C. for the [B3]-containing resin compositions. The thus-obtained moldings were evaluated for transparency, mechanical properties, antistatic properties, water resistance and paintability by the following methods. The results are shown in Tables 3 to 4.

[1] Transparency (1) Total Luminous Transmittance

Test specimens (40×40×2 mm) were tested according to JIS K 7105 (1981) using a haze meter [Nippon Denshoku Kogyo model NDH-1001DP; hereinafter the same shall apply].

(2) Haze

Test specimens (40×40×2 mm) were tested according to JIS K 7105 (1981) using the haze meter.

[2] Mechanical Properties
  (1) Impact Strength
  Measurements were made according to ASTM D 256 (notched, 3.2 mm in thickness) Method A.
  (2) Modulus of Elasticity in Bending
  Test specimens (100×10×4 mm) were tested according to ASTM D 790 (span length: 60 mm).

[3] Antistatic Properties
  (1) Surface Resistivity
  Test specimens (100×100×2 mm) were tested in an atmosphere of 23° C. and 50% RH using a superinsulation resistance meter [Toa Denpa Kogyo model DSM-8103 (SME-8310 electrodes for flat sheet specimens); hereinafter the same shall apply] (according to ASTM D 257).
  (2) Surface Resistivity After Washing With Water
  The surface of each test specimen (100×100×2 mm) held on a slant was washed with 100 ml of deionized water (23° C.) at a flow rate of 100 ml/minute and then dried at 80° C. in a circulating air drier for 3 hours. Such washing with water and drying procedure was repeated 10 times in total. The test specimen thus prepared was subjected to surface resistivity measurement in the same manner as in (1) in an atmosphere of 23° C. and 50% RH using a superinsulation resistance meter (according to ASTM D 257).

[4] Water Resistance
  Tap water was poured into a covered polypropylene vessel, 15 cm in diameter and 20 cm in height, to a depth of 15 cm and adjusted to a temperature of 40° C. Each test specimen (100×100×2 mm) was held therein horizontally at a level about 5 cm below the surface of the water for 120 hours, and the surface condition was then observed by the eye and evaluated according to the following criteria.

Evaluation Criteria
Excellent: Comparison between the surface condition before immersion and that after immersion revealed no change.
Poor: Warty blistering and/or uneven surface roughness.

[5] Paintability
  Each test specimen (100×100×2 mm) was earthed and electrostatically coated using an air flow-combined electrostatic atomization type electrostatic sprayer [Ransburg Japan's Turbonia G Minibell automated electrostatic spray coater] (voltage applied: −90 KV, discharge: 100 cc/minute, rotational speed: 24,000 rpm, atomizing head diameter: 70 mm, two-can urethane paint: NOF Corporation High Urethane #5000). The coated test specimen was subjected to baking treatment at 80° C. for 2 hours and then to the tests mentioned below. Prior to the electrostatic coating, the test specimen was subjected to corona treatment (30 V×10 A=300 W, 1 second) using a corona treatment apparatus [Kasuga Denki model HFS-202].

(1) Primary Adhesiveness
  The coat film surface of each coated test specimen was subjected to adhesion (primary adhesiveness) testing according to JIS K 5400 (1990) 8.5.2. Cross cut and tape method.

(2) Coat Film Water Resistance
  Tap water was poured into a covered polypropylene vessel, 15 cm in diameter and 20 cm in height, to a depth of 15 cm and adjusted to a temperature of 40° C. Each test specimen was held therein horizontally at a level about 5 cm below the surface of the water for 240 hours and then subjected to adhesion (primary adhesiveness) testing in the same manner as in (1).

(3) Coating Efficiency
  The following formula was used:

Coating efficiency (%)=((test specimen weight after coating) −(test specimen weight before coating))×100/(bone-dry weight of paint discharged)

The bone-dry weight of the paint was determined by the following method.

A 10-g portion of the paint was placed in a dish with a diameter of 15 cm and 1 cm in depth and dried in a circulating air drier at 80° C. for 2 hours, the weight (W1) of the paint after drying was measured, and the calculation was made according to the following formula:

Bone-dry weight of paint discharged=(weight of paint discharged in coating test)×(W1)/10

TABLE 3

| | Transparency | | Mechanical properties | | Antistatic properties | | | Paintability | | |
| | Total luminous transmittance (%) | Haze (%) | Impact strength (J/m) | Modulus of elasticity in bending (MPa) | Surface resistivity (Ω) | Surface resistivity after washing with water (Ω) | Water resistance | Primary adhesiveness | Coat film water resistance | Coating efficiency (%) |
|---|---|---|---|---|---|---|---|---|---|---|
| Example 1 | 85 | 1.2 | 650 | 2200 | $3 \times 10^{11}$ | $3 \times 10^{11}$ | Excellent | 100/100 | 100/100 | 82 |
| Example 2 | 89 | 0.6 | 80 | 1500 | $2 \times 10^{11}$ | $2 \times 10^{11}$ | Excellent | 100/100 | 100/100 | 83 |
| Example 3 | 89 | 0.6 | 550 | 1800 | $1 \times 10^{11}$ | $1 \times 10^{11}$ | Excellent | 100/100 | 100/100 | 85 |
| Example 4 | 85 | 1.2 | 790 | 2200 | $2 \times 10^{11}$ | $2 \times 10^{11}$ | Excellent | 100/100 | 100/100 | 83 |
| Example 5 | 89 | 0.6 | 800 | 2200 | $1 \times 10^{11}$ | $1 \times 10^{11}$ | Excellent | 100/100 | 100/100 | 85 |
| Example 6 | 84 | 2.1 | 100 | 2300 | $1 \times 10^{11}$ | $1 \times 10^{11}$ | Excellent | 100/100 | 100/100 | 85 |
| Example 7 | 89 | 0.6 | 500 | 1800 | $1 \times 10^{11}$ | $1 \times 10^{11}$ | Excellent | 100/100 | 100/100 | 85 |
| Example 8 | 82 | 4 | 100 | 2300 | $1 \times 10^{11}$ | $1 \times 10^{11}$ | Excellent | 100/100 | 100/100 | 85 |
| Example 9 | 85 | 1 | 100 | 2300 | $8 \times 10^{10}$ | $9 \times 10^{10}$ | Excellent | 100/100 | 100/100 | 86 |
| Example 10 | 84 | 2.0 | 550 | 1800 | $8 \times 10^{10}$ | $9 \times 10^{10}$ | Excellent | 100/100 | 100/100 | 86 |
| Example 11 | 89 | 0.6 | 550 | 1800 | $1 \times 10^{10}$ | $3 \times 10^{10}$ | Excellent | 100/100 | 100/100 | 88 |
| Example 12 | 89 | 0.6 | 800 | 2200 | $1 \times 10^{11}$ | $1 \times 10^{11}$ | Excellent | 100/100 | 100/100 | 85 |
| Example 13 | 84 | 2.1 | 100 | 2300 | $1 \times 10^{10}$ | $3 \times 10^{10}$ | Excellent | 100/100 | 100/100 | 88 |
| Example 14 | 84 | 2.1 | 120 | 2300 | $1 \times 10^{11}$ | $1 \times 10^{11}$ | Excellent | 100/100 | 100/100 | 85 |

TABLE 4

| | Transparency | | Mechanical properties | | Antistatic properties | | | | Paintability | |
|---|---|---|---|---|---|---|---|---|---|---|
| | Total luminous transmittance (%) | Haze (%) | Impact strength (J/m) | Modulus of elasticity in bending (MPa) | Surface resistivity (Ω) | Surface resistivity after washing with water (Ω) | Water resistance | Primary adhesiveness | Coat film water resistance | Coating efficiency (%) |
| Comparative Example 1 | 78 | 55.0 | 140 | 1400 | $7 \times 10^{13}$ | $4 \times 10^{13}$ | Poor | 75/100 | 63/100 | 61 |
| Comparative Example 2 | 78 | 55.0 | 400 | 1400 | $7 \times 10^{13}$ | $8 \times 10^{13}$ | Poor | 75/100 | 63/100 | 61 |
| Comparative Example 3 | 81 | 46.3 | 70 | 1400 | $7 \times 10^{11}$ | $8 \times 10^{11}$ | Excellent | 100/100 | 100/100 | 79 |
| Comparative Example 4 | 68 | 65.0 | 40 | 1500 | $8 \times 10^{13}$ | $9 \times 10^{13}$ | Poor | 100/100 | 100/100 | 59 |
| Comparative Example 5 | 25 | 80 | 450 | 1700 | $1 \times 10^{13}$ | $1 \times 10^{13}$ | Excellent | 100/100 | 100/100 | 65 |
| Comparative Example 6 | 87 | 7 | 530 | 2100 | $1 \times 10^{13}$ | $1 \times 10^{13}$ | Poor | 100/100 | 45/45 | 65 |

As is evident from the data in Tables 3 and 4, the moldings formed from the resin compositions of Examples 1 to 14 are superior in transparency as well as in mechanical properties, antistatic properties, water resistance and paintability as compared with the moldings made of the resin compositions of Comparative Examples 1 to 6.

INDUSTRIAL APPLICABILITY

The moldings formed from the transparent resin composition of the invention have good permanent antistatic properties, mechanical properties, water resistance and transparency and are also excellent in paintability and printability. Therefore, the transparent resin composition of the invention can be used widely as a material for manufacturing various molded articles to be formed by various molding methods such as injection molding, compression molding, calendering, slush molding, rotational molding, extrusion molding, blow molding and film forming (e.g. casting, tentering, inflation) techniques, for example housings for household electric appliances, office automation appliances, game players and business machines, IC trays and other various plastics vessels or containers, various packaging films, flooring sheets, artificial turfs, mats, and automotive parts.

The invention claimed is:

1. A transparent resin composition which comprises at least one block polymer (A) selected from the group consisting of (A1) and (A2) defined below and a transparent resin (B), with the difference in refractive index between (A) and (B) being not more than 0.01:

(A1): A block polymer composed of an aromatic ring-containing lipophilic block (a) having a refractive index of not lower than 1.575 and a volume resistivity of $10^{12}$ to $10^{17}$ Ω·cm and an aromatic ring-containing hydrophilic block (b) having a volume resistivity of $10^5$ to $10^{11}$ Ω·cm and a thermal degradation temperature of 250 to 380° C. in air, with the difference in SP value from (B) being not greater than 1;

(A2): A block polymer composed of an aromatic ring-containing lipophilic block (a) having a refractive index of not lower than 1.575 and a volume resistivity of $10^{12}$ to $10^{17}$ Ω·cm, an aromatic ring-containing hydrophilic block (b) having a volume resistivity of $10^5$ to $10^{11}$ Ω·cm and a thermal degradation temperature of 250 to 380° C. in air and a transparent resin block (c) having a refractive index of not lower than 1.540 and a difference in SP value from (B) of 0 to 0.5, with the difference in SP value from (B) being not greater than 1.5;

(B): A transparent resin having a refractive index of not lower than 1.540, and wherein (b) is at least one block selected from the group consisting of:
  (b1): nonionic hydrophilic blocks comprising an alkylene oxide adduct derived from a dihydric phenol;
  (b2): anionic hydrophilic blocks; and
  (b3): cationic hydrophilic blocks.

2. The composition according to claim 1 wherein (A1) is a block polymer having a structure such that (a) and (b) are linked together one after the other.

3. The composition according to claim 1 wherein (A1) is a graft polymer having a structure such that (b) as the main chain has (a) in the form of side chains.

4. The composition according to claim 1 wherein (c) is at least one transparent resin block selected from the group consisting of polycarbonate resins, polyester resins and/or polystyrene resins.

5. The composition according to claim 1 wherein the proportion of (c) relative to the total weight of (a), (b) and (c) constituting (A2) is 1 to 50%.

6. The composition according to claim 1 wherein the aromatic ring constituent of (a) is at least one species selected from the group consisting of benzene, naphthalene and fluorene rings.

7. The composition according to claim 1 wherein (a) is a block containing at least one linkage selected from the group consisting of an ether linkage, thioether linkage, carbonyl linkage, ester linkage, imino linkage, amide linkage, imide linkage, urethane linkage, urea linkage, carbonate linkage and siloxy linkage, and every two of which are separated from each other by a nonionic molecular chain (d).

8. The composition according to claim 1 wherein (a) is a block containing polyester oligomers and/or polyamide oligomers.

9. The composition according to claim 1 wherein (b) is one or two of the blocks selected from the group consisting of:
(b1): nonionic hydrophilic blocks comprising an alkylene oxide adduct derived from a dihydric phenol; and
(b2): anionic hydrophilic blocks.

10. The composition according to claim 1 wherein the weight ratio between (a) and (b) is 80/20 to 10/90.

11. The composition according to claim 1 wherein (B) is at least one species selected from the group consisting of (B1), (B2) and (B3) defined below:
(B1) polycarbonate resins,
(B2) polyester resins, and
(B3) polystyrene resins.

12. The composition according to claim 1 wherein the weight ratio between (A) and (B) is 1/99 to 40/60.

13. The composition according to claim 1 which further contains at least one additive (C) selected from the group consisting of alkali metal or alkaline earth metal salts, surfactants, compatibilizers and ionic liquids.

14. A molded article produced by molding the composition according to claim 1 and having a haze of not higher than 20%.

15. A molded product obtainable by coating of and/or printing on the molded article according to claim 14.

* * * * *